United States Patent

Kawakami et al.

[11] Patent Number: 6,088,596
[45] Date of Patent: Jul. 11, 2000

[54] DATA TRANSFER DEVICE FOR A PORTABLE TELEPHONE

[75] Inventors: Hidetoshi Kawakami; Munenori Hatae; Soichi Kuwahara, all of Fukuoka, Japan

[73] Assignee: Fujitsu Limited, Kanagawa, Japan

[21] Appl. No.: 09/027,983

[22] Filed: Feb. 23, 1998

[30] Foreign Application Priority Data

Nov. 7, 1997 [JP] Japan .................................... 9-186715

[51] Int. Cl.⁷ ...................................................... H04B 1/00
[52] U.S. Cl. ............................ 455/466; 455/515; 370/253
[58] Field of Search ...................................... 455/466, 515, 455/422, 450, 434, 403; 370/254, 253, 252, 468, 347

[56] References Cited

U.S. PATENT DOCUMENTS

| | | | |
|---|---|---|---|
| 5,289,471 | 2/1994 | Tanaka et al. | 370/347 |
| 5,719,859 | 2/1998 | Kobayashi et al. | 370/347 |
| 5,802,465 | 12/1999 | Hamalainen et al. | 455/403 |
| 6,002,673 | 12/1999 | Kahn et al. | 370/252 |

FOREIGN PATENT DOCUMENTS 6268583 9/1994 Japan .
8126047 5/1996 Japan .

*Primary Examiner*—Doris H. To
*Attorney, Agent, or Firm*—Helfgott & Karas, P.C.

[57] ABSTRACT

A data transfer device for a portable telephone which device is capable of achieving efficient and reliable transfer of data and minimizing the influence on vocal communication and restrictions on the availability of added services. When data is to be transferred from data terminal equipment connected to a portable telephone to another data terminal equipment connected to a portable telephone at a remote side of a network during vocal communication, transfer data quantity measuring unit measures the data quantity of the transfer data. Channel selecting unit compares the measured data quantity with a predetermined value, and selects one of a fast associated control channel and a slow associated control channel in accordance with the result of comparison. Using the channel selected by the channel selecting unit, data transfer unit sends the transfer data input from the data terminal equipment to a radio link.

12 Claims, 25 Drawing Sheets

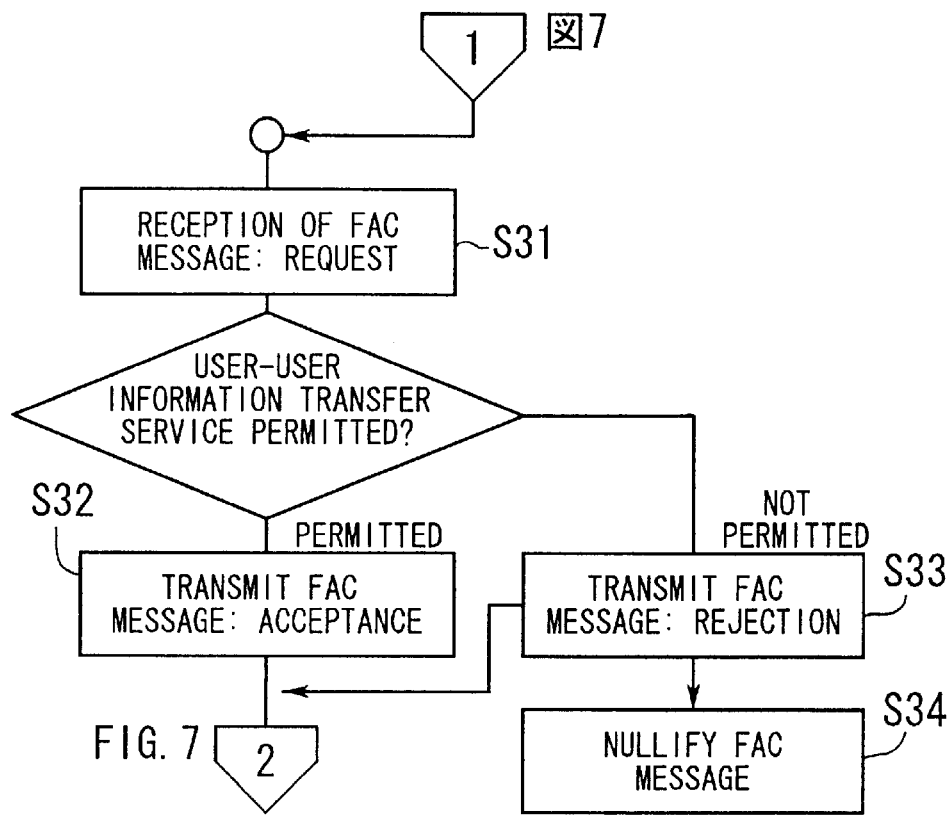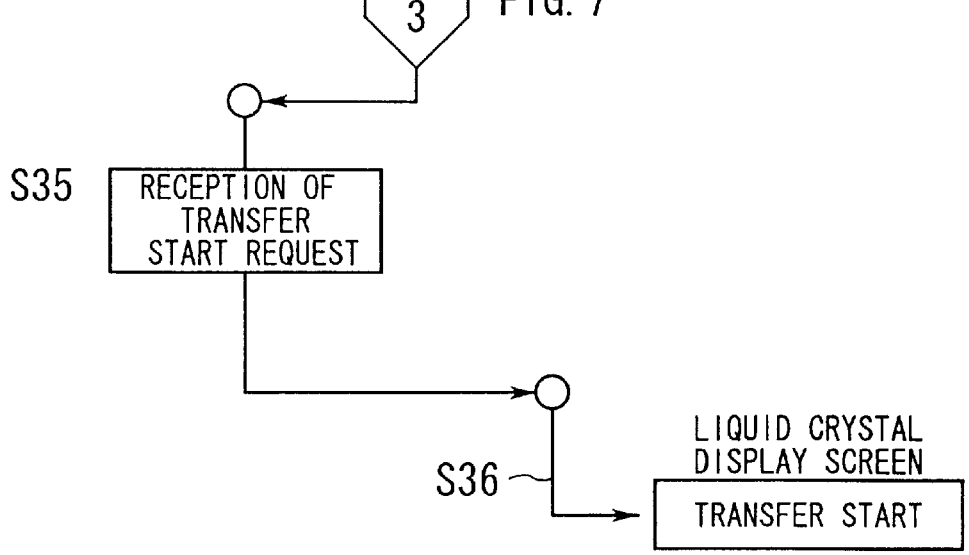
FIG. 11

| 7 | 6 | 5 | 4 | 3 | 2 | 1 | 0 |
|---|---|---|---|---|---|---|---|
| PROTOCOL IDENTIFIER ||||||||
| ADDED SERVICE IDENTIFIER |||| | *1 | CALL NO. ||
| 0 | MESSAGE TYPE |||||||
| 0 | USER-USER INFORMATION ELEMENT IDENTIFIER |||||||
| USER-USER CONTENT LENGTH ||||||||
| PROTOCOL IDENTIFIER ||||||||
| INFORMATION TYPE ||||||||
| TRANSMISSION SERIAL NO. |||| RECEPTION SERIAL NO. ||||
| CONTROL INFORMATION/ TRANSFER DATA CONTENT LENGTH ||||||||
| CONTROL INFORMATION/ TRANSFER DATA ||||||||

*1: CALL NO. FLAG

FIG. 15

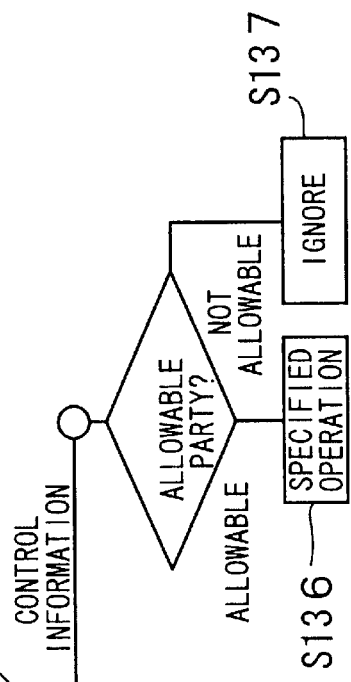
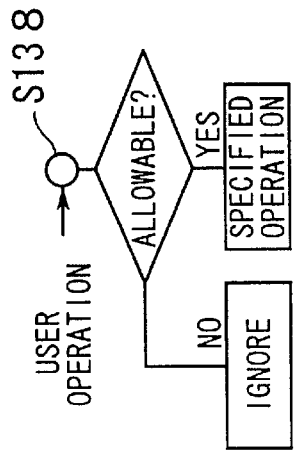
FIG. 24
FIG. 25

DATA TRANSFER DEVICE FOR A PORTABLE TELEPHONE

BACKGROUND OF THE INVENTION (1) Field of the Invention

The present invention relates to a data transfer device for a portable telephone, and more particularly, to a data transfer device of a portable telephone to which data terminal equipment having a data transmitting/receiving function is connectable and which has a radio link provided with an information channel, a fast associated control channel and a slow associated control channel.

(2) Description of the Related Art

Reduction in size of notebook personal computers, popularization of portable information terminal equipment and like factors have widened the use of portable telephones not only as a means of vocal communication but also as a means of transferring information such as characters, data, etc.

Also, because of inexpensive portable terminal equipment, reduction in the charge for use, etc., portable telephones have rapidly come into wide use and even more diverse uses thereof are expected in the future. Especially, there is an increasing demand for portable terminal equipment to which data terminal equipment is connectable to permit data transfer from one data terminal equipment to another, and development of higher-efficiency data transfer techniques is hoped for. Among various data transfer procedures to be expected, a procedure that permits efficient data transfer while conversation is going on during a call is particularly hoped for. A need for data transfer during vocal communication arises, for example, in cases where one desires to inform the other party of his or her address or mail address during vocal communication, one desires to send a text document and then to converse with the other party while viewing the document, or one desires to transfer telephone number data stored in the memory of the portable telephone.

In conventional hardware configuration for data transfer using a portable telephone in general, the input/output port of data terminal equipment and the input/output port of the portable telephone are connected to each other by a conversion adapter (or a mobile card). The data terminal equipment and the conversion adapter are interfaced by RS-232C.

For a radio section between the portable telephone and a base station, a standard (RCR-STD-27D) designed for digital mobile telephone systems is applied. According to this standard, a communication slot in TDMA frame structure is provided with two 112-bit information channels TCH (Traffic Channel), and usually these two information channels TCH are used to transmit coded voice. In the case of transferring data with data terminal equipment connected with a portable telephone, the two information channels TCH are allocated for the transmission of transfer data.

FIG. 25 is a sequence diagram illustrating a conventional procedure for switching between telephone communication and non-telephone communication (facsimile transmission, data communication), prescribed by the standard (RCR-STD-27D) for digital mobile telephone systems. With reference to FIG. 25, the conventional procedure will be explained below on the assumption that portable telephones A1 and A2 are connected to each other via a base station B1, an exchange C1, another exchange C2, and. another base station B2.

If a need for data transfer from the portable telephone A1 to the portable telephone A2 arises during vocal communication (D1) between the portable telephones A1 and A2 via the information channels TCH, switching to the non-telephone communication is requested vocally from the portable telephone A1 to the other party, so as to have the operation mode of the portable telephone A2 switched (D2) to the non-telephone communication. The portable telephone A2 thus switched transmits an INFO (FA) message, which is a CC message of layer 3, to the network to which it is connected, thereby making a communication mode switching request (D3). An INFO (FI) message responsive to the switching request is thereafter sent from the network (D4), and on receiving this message, the portable telephone A2 enters into a non-telephone communication mode in which data transfer can be performed.

After the operation mode of the portable telephone A2 is switched to the non-telephone communication mode, switching of the portable telephone A1 to the non-telephone communication is performed (D5) so that the operation mode thereof may be switched to the non-telephone communication mode. As a result, steps D6 and D7 similar to the steps D3 and D4, respectively, are executed. In this manner, a data transfer state (D8) is established between the portable telephones A1 and A2 via the information channels TCH.

Then, when the data transfer has been completed, the operation mode of the portable telephone A1 is switched (D9) to the telephone communication mode. Consequently, steps D10 and D11 similar to the steps D3 and D4, respectively, are executed. Subsequently, the operation mode of the portable telephone A2 is switched (D12) to the telephone communication mode, and as a result, steps D13 and D14 similar to the steps D3 and D4, respectively, are executed. Thus, a vocal communication state (D15) between the portable telephones A1 and A2 via the information channels TCH is resumed.

In the conventional system, however, data transfer is carried out using the two information channels (TCH), regardless of the quantity of data to be transferred. Accordingly, a problem arises not only in that vocal communication is inconveniently not available during data transfer, but also in that, even in the case where the quantity of transfer data is small, the two information channels (TCH) are occupied and thus the data transmission efficiency is low.

Also, when a need for data transfer arises during vocal communication, the party concerned vocally informs the other party during the vocal communication that data transfer is to be started, and after the communication modes of the two parties are switched to the non-telephone communication mode, he/she starts the data transfer. To resume vocal communication after completion of the data transfer, the communication modes are switched back to the telephone communication mode. Thus, the sequence of operations involves not a few manual operations, posing a problem that difficulty arises in performing data transfer without fail and also that data transfer requires much time.

Further, the aforementioned conventional procedure provides no reliable means for the portable telephone A1 to notify the portable telephone A2 that the data transfer has been completed, thus incurring the possibility that the portable telephone A2 is erroneously switched back to vocal communication during the data transfer, or the possibility that the portable telephone A2 fails to be switched back to vocal communication for an unnecessary long time even though the data transfer has already been completed.

In the conventional system, moreover, since vocal communication is not possible during data transfer, a problem arises in that added services for a second call, such as call waiting, three-party speech, etc., are not available.

SUMMARY OF THE INVENTION

An object of the present invention is to provide a data transfer device for a portable telephone which is capable of achieving efficient and reliable transfer of data and also minimizing the influence on vocal communication as well as the restrictions on the availability of added services.

To achieve the above object, there is provided a data transfer device for a portable telephone, to which data terminal equipment having a data transmitting/receiving function is connectable and which has a radio link provided with an information channel, a fast associated control channel and a slow associated control channel. The data transfer device for a portable telephone comprises transfer data quantity measuring means for measuring a data quantity of transfer data input from the data terminal equipment, channel selecting means for comparing the data quantity measured by the transfer data quantity measuring means with a predetermined value and selecting one of the fast associated control channel and the slow associated control channel in accordance with a result of the comparison, data transfer means for sending the transfer data input from the data terminal equipment to the radio link by using the channel selected by the channel selecting means, and voice transmitting means for performing voice transmission by using the information channel, regardless of whether or not data transfer is performed by the data transfer means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 11 is a flowchart showing a first part of a data transfer process executed by a portable telephone of a data receiving side;

FIG. 15 is a diagram showing a USER-INFO message format;

FIG. 24 is a flowchart showing the latter half of the authentication procedure.

DESCRIPTION OF THE PREFERRED EMBODIMENTS

An embodiment according to the present invention will be hereinafter described with reference to the drawings.

Figure 1:
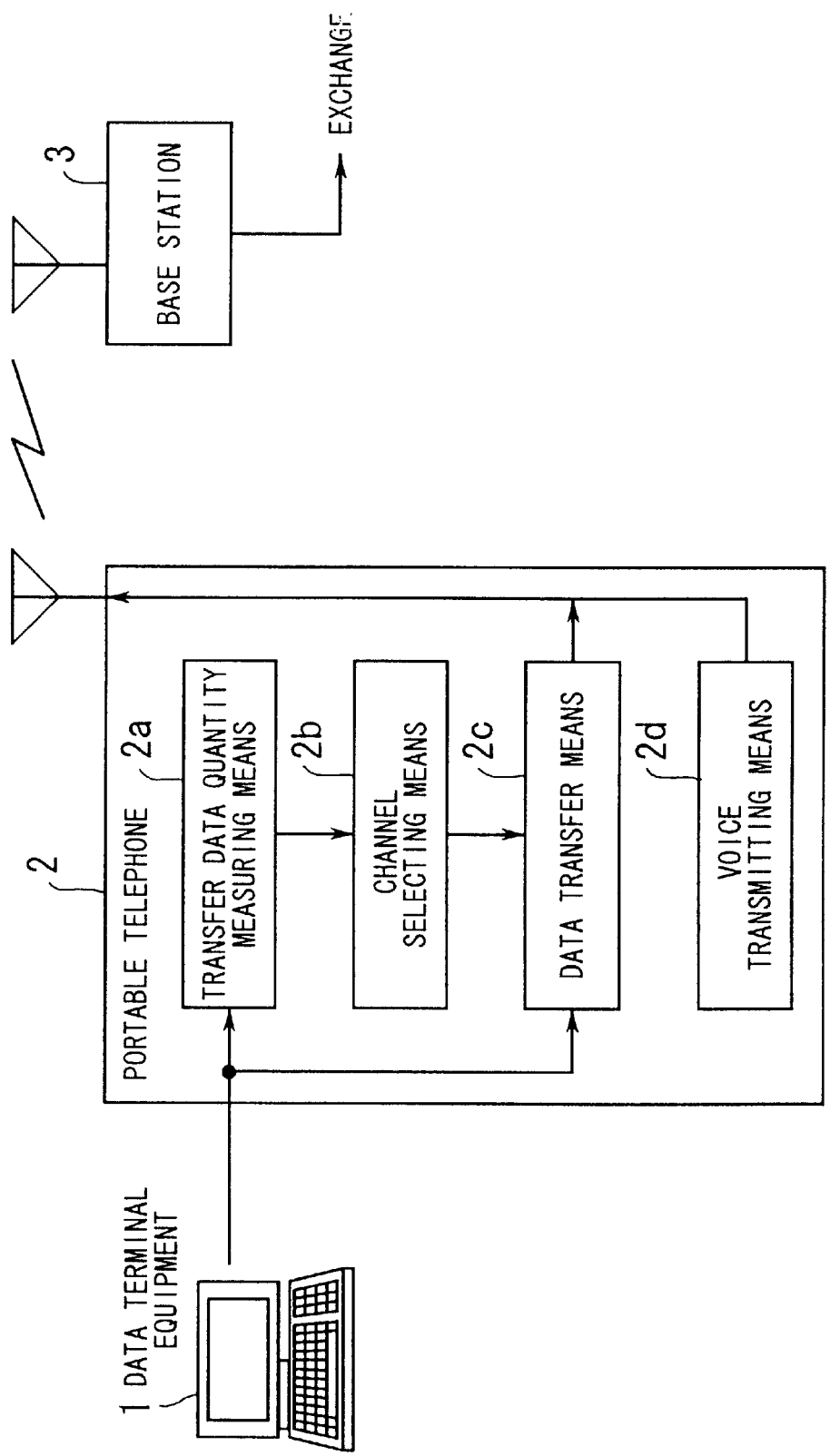
FIG. 1 is a diagram illustrating the principle of the present invention.

Referring first to FIG. 1, a theoretical configuration of the embodiment according to the present invention will be explained. A data transfer device for a portable telephone according to the embodiment of the invention comprises transfer data quantity measuring means 2a for measuring the data quantity of transfer data input to a portable telephone 2 from data terminal equipment 1, channel selecting means 2b for comparing the data quantity measured by the transfer data quantity measuring means 2a with a predetermined value and selecting one of a fast associated control channel and a slow associated control channel to be set on a radio link in accordance with the result of comparison, data transfer means 2c for sending the transfer data input from the data terminal equipment 1 to the radio link, by using the channel selected by the channel selecting means 2b, and voice transmitting means 2d for performing voice transmission by using an information channel, regardless of whether or not data transfer is performed by the data transfer means 2c.

In the configuration described above, a standard (RCR-STD-27D) designed for digital mobile telephone systems is applied to the radio link between the portable telephone 2 and a base station 3. A communication slot in TDMA frame structure as prescribed by this standard will be described with reference to FIG. 2.

Figure 2:
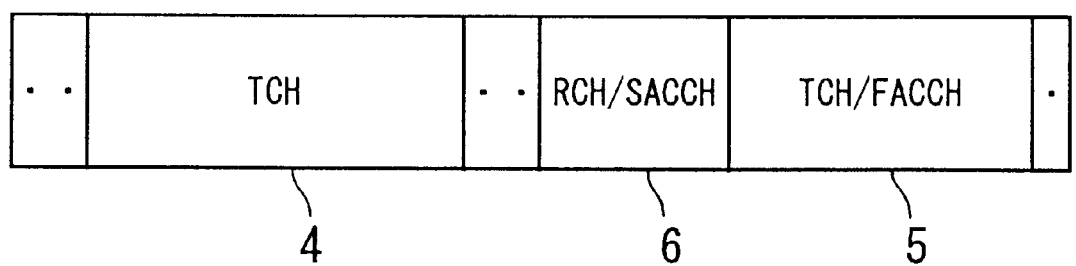
FIG. 2 is a diagram showing the structure of a communication slot prescribed by the standard (RCR-STD-27D) for digital mobile telephone systems.

FIG. 2 is a diagram showing a communication slot structure prescribed by the standard (RCR-STD-27D) for digital mobile telephone systems. This slot consists of 280 bits and is provided therein with zones 4 and 5 of 112 bits long each and a 15-bit zone 6. The zones 4 and 5 can each be used as an information channel TCH or an FACCH (Fast Associated Control Channel), while the zone 6 can be used as a housekeeping channel RCH or an SACCH (Slow Associated Control Channel). According to the present invention, the zone 4 is always used as an information channel TCH exclusively for vocal communication, and the zone 5 is used as an information channel TCH or a fast associated control channel FACCH appropriately. Specifically, when a decision is made that data should be transferred on a fast associated control channel FACCH, data transfer is performed using the zone 5 as a fast associated control channel FACCH; on the other hand, when a decision is made that data should be transferred on a slow associated control channel SACCH, the zone 5 is used as an information channel TCH for vocal communication and the data transfer is performed using the zone 6 set as a slow associated control channel SACCH.

Referring again to FIG. 1, in the case of ordinary vocal communication, the portable telephone 2 is connected to an exchange via the base station 3 and the voice transmitting means 2d communicates with an ordinary telephone or portable telephone connected at a remote side of the network. In this case, the zone 5 is set as an information channel TCH and is used, along with the information channel TCH of the zone 4, for the vocal communication.

In the case where, during the vocal communication, data needs to be transferred from the data terminal equipment 1 connected to the portable telephone 2 to data terminal equipment (not shown) connected, for example, to a portable telephone (also not shown) at a remote side of the network, first, the transfer data quantity measuring means 2a measures the data quantity of transfer data input from the data terminal equipment 1. The channel selecting means 2b compares the measured data quantity with the predetermined value and, in accordance with the result of comparison, selects one of the fast associated control channel FACCH and the slow associated control channel SACCH. Using the channel selected by the channel selecting means 2b, the data transfer means 2c sends the transfer data input from the data terminal equipment 1 to the radio link. Also while the data transfer is carried out in this way, the voice transmitting means 2d performs voice transmission by using the information channel TCH.

Thus, even during data transfer, vocal communication can be performed concurrently, and the channel selecting means 2b selects an appropriate one of the fast associated control channel FACCH and the slow associated control channel SACCH so that the data transfer may be performed using the selected channel. When the slow associated control channel is selected by the channel selecting means 2b, the voice transmitting means 2d performs voice transmission by using the information channel TCH and the fast associated control channel FACCH. Accordingly, the portable telephone 2 is capable of high-efficiency data transfer and also can transfer data while minimizing the influence on vocal communication as well as the restrictions on the availability of added services.

The channel selecting means 2b selects the fast associated control channel when the data quantity measured by the transfer data quantity measuring means 2a is larger than the predetermined value, and selects the slow associated control channel when the former is smaller than the latter. This permits more efficient transfer of data.

Instead of the above selection method, the channel selecting means 2b may alternatively select an applicable channel as described below.

In this case, the data transfer device for a portable telephone according to the present invention further comprises silent state monitoring means for monitoring vocal communication to detect a silent state, and saving means for receiving from outside priority specification information specifying a preferential one of vocal communication and data transfer and storing the priority specification information. The channel selecting means 2b selects one of the fast and slow associated control channels not only in accordance with the data quantity measured by the transfer data quantity measuring means 2a, but also depending on whether a silent state is detected by the silent state monitoring means and in accordance with the priority specification information stored in the saving means.

The data transfer device for a portable telephone according to the embodiment of the present invention will be now described in more detail.

Figure 3:
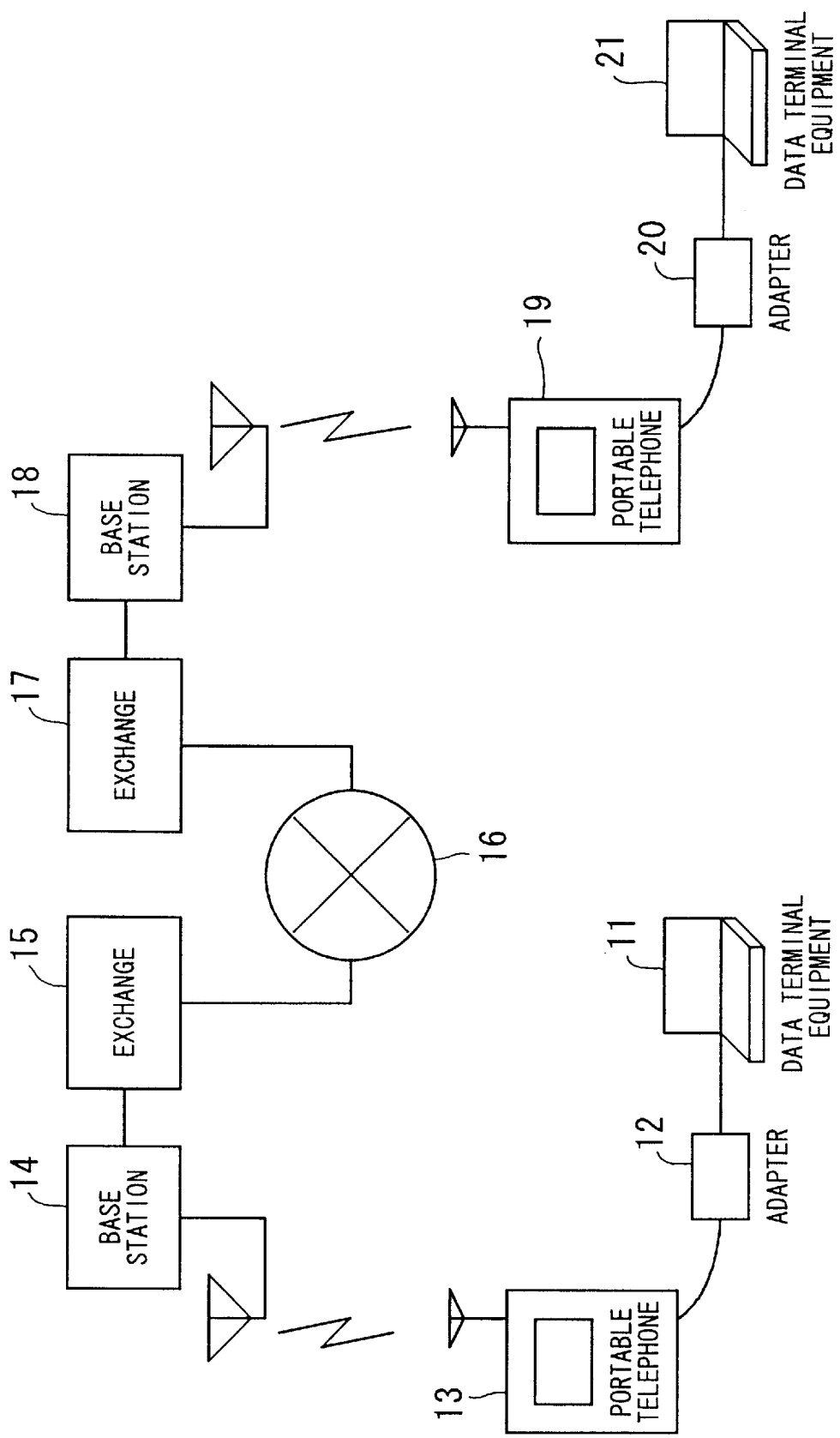
FIG. 3 is a diagram showing, by way of example, the configuration of an entire network including a radio network for portable telephones.

FIG. 3 is a diagram showing, by way of example, the configuration of an entire network including a radio network for portable telephones. In the configuration shown in FIG. 3, exchanges 15 and 17 are connected to a network 16, and base stations 14 and 18 are connected to the respective exchanges 15 and 17. A portable telephone 13 is connected to the base station 14 via a radio link, and another portable telephone 19 is connected to the base station 18 via a radio link. Data terminal equipment 11 is connected to the portable telephone 13 through an adapter 12. The portable telephone 13 and the data terminal equipment 11 each have an input/output port and are individually connected to the adapter 12 via the respective input/output ports. Similarly, data terminal equipment 21 is connected to the portable telephone 19 through an adapter 20.

In the aforementioned configuration, transfer data transmitted from the data terminal equipment 11 is set within a USER-INFO message, which is a CC message of layer 3, at the portable telephone 13. Then, using the fast associated control channel FACCH or the slow associated control channel SACCH selected in accordance with the transmit data quantity, vocal communication state, etc., the transfer data is transmitted to the radio link.

The transfer data from the data terminal equipment 11 is routed via the base station 14, the exchange 15, the network 16, the exchange 17 and the base station 18, is again set within a USER-INFO message, and sent to the portable telephone 19 via the radio link. Following a procedure reverse to that mentioned above, the portable telephone 19 transmits the transfer data to the data terminal equipment 21. In the case where the contents of the USER-INFO message that the portable telephone 19 has received from the portable telephone 13 are not transfer data but control information, the operation of the portable telephone 19 is determined in accordance with the contents of the control information thus notified.

Figure 4:
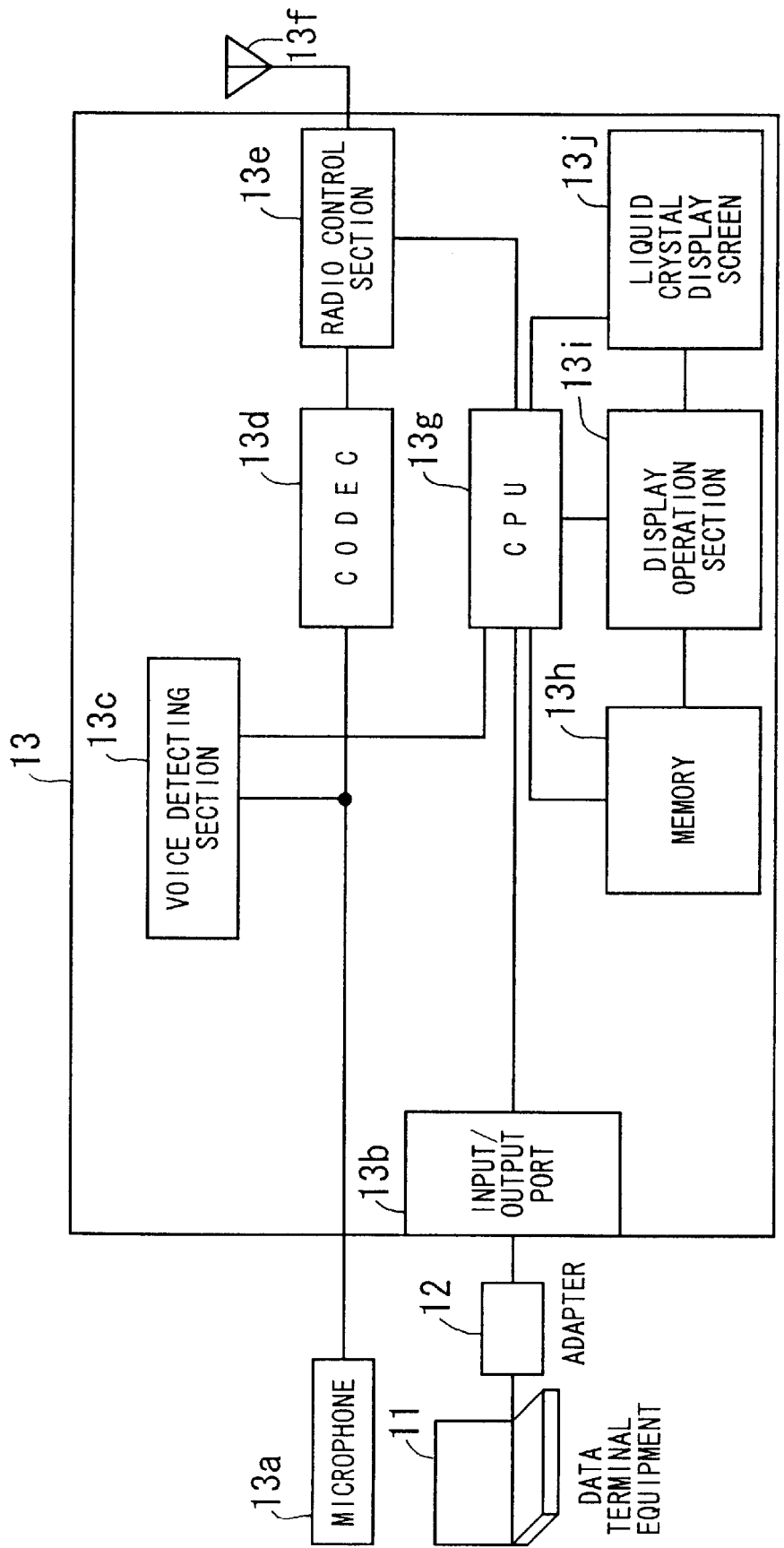
FIG. 4 is a diagram showing the internal arrangement of a portable telephone.

FIG. 4 is a diagram showing the internal arrangement of the portable telephone 13. The portable telephone 19 has the same internal arrangement as that of the portable telephone 13.

The portable telephone 13 comprises a microphone 13a, an input/output port 13b, a voice detecting section 13c, a CODEC 13d, a radio control section 13e, an antenna 13f, a CPU 13g, a memory 13h, a display operation section 13i, a liquid crystal display screen 13j, etc.

Figure 5:
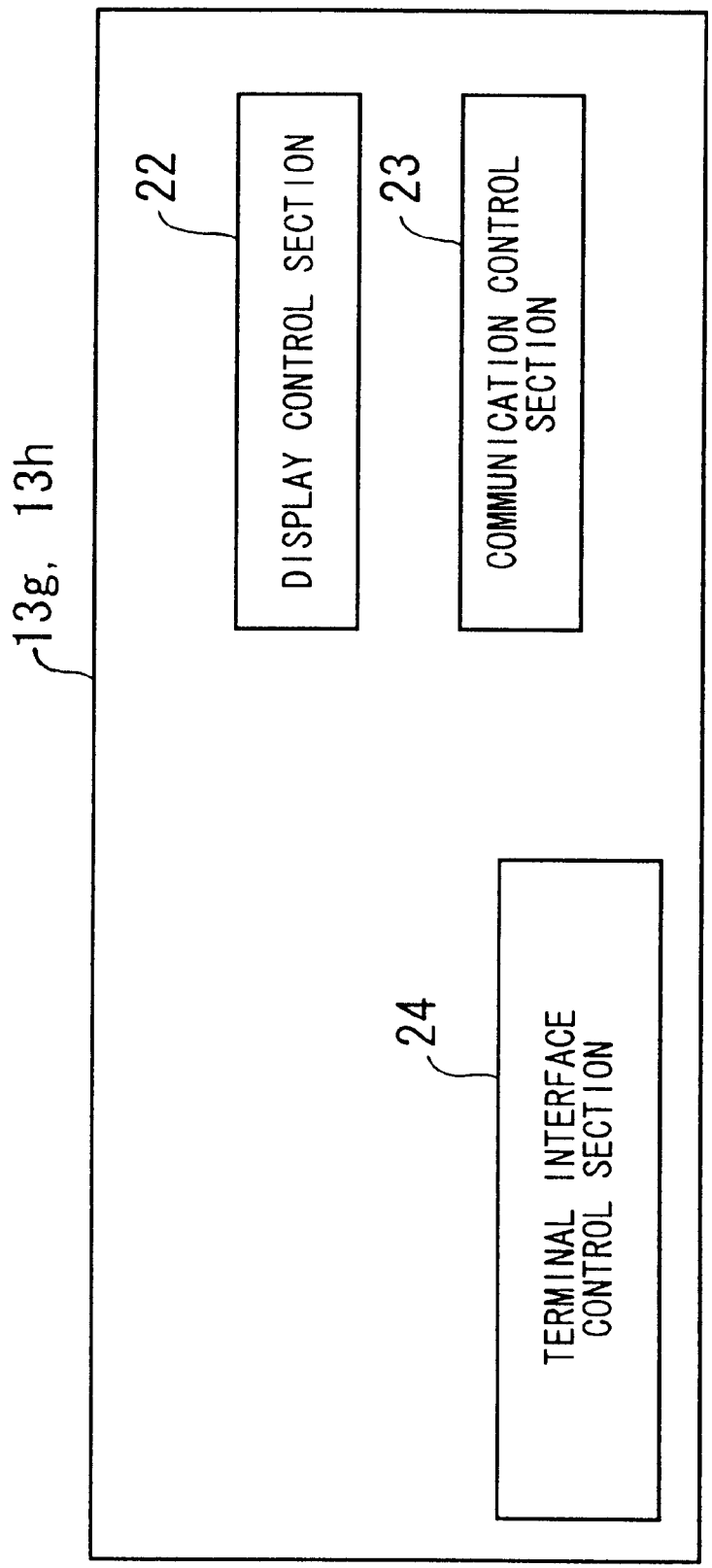
FIG. 5 is a block diagram showing various functions achieved by execution of programs stored in memory by a CPU.

FIG. 5 is a block diagram showing various functions achieved by execution of programs stored in the memory 13h by the CPU 13g. Specifically, the functions are represented mainly as a display control section 22, a communication control section 23 and a terminal interface control section 24.

Referring to FIGS. 4 and 5, the voice detecting section 13c monitors the output from the microphone 13a to detect a vocal communication state and notifies the communication control section 23 of the detected vocal communication state.

The terminal interface control section 24 controls the transmission/reception of data between the portable telephone 13 and the data terminal equipment 11, stores received data in a recording area of the memory 13h, reads out data from the recording area, and controls data transmission/reception with respect to the communication control section 23.

The communication control section 23 controls layers 2 and 3 of radio communication as prescribed by the standard (RCR-STD-27D) for digital mobile telephone systems, and also carries out a process for achieving communication-related operations and services of the portable telephone. For example, the communication control section 23 sets data sent from the terminal interface control section 24 within a USER-INFO message, determines a transmission channel in accordance with the vocal communication state notified from the voice detecting section 13c, the data quantity notified from the terminal interface control section 24 and priority discrimination information retained in the memory 13h, and also starts monitoring non-communication if data is being transferred following the end of speech.

The display control section 22 is a part which performs a control operation in accordance with user operated instructions input from the display operation section 13i and which also controls the operation of the portable telephone 13 such as screen display. For example, the display control section 22 notifies the communication control section 23 of a process request (e.g., data transfer start) complying with the user operation, and determines the operation of the portable telephone 13 in accordance with the control information notified from the communication control section 23.

Figure 6:
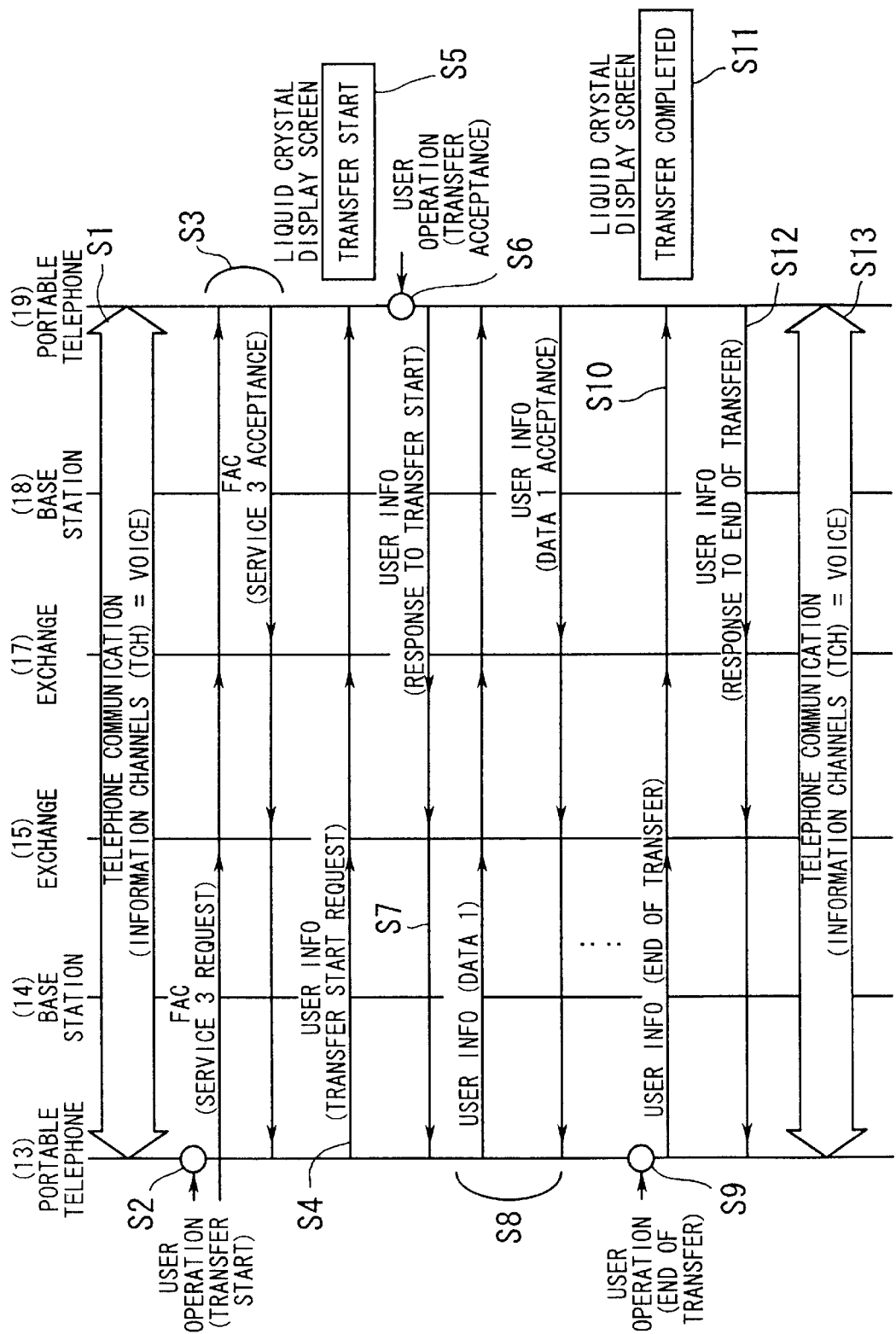
FIG. 6 is a sequence diagram illustrating a main procedure for communication between portable telephones.

FIG. 6 is a sequence diagram illustrating a main procedure for communication between the portable telephones 13 and 19. The communication procedure will be explained below with reference to the step (S) numbers shown in FIG. 6.

If, during a vocal communication state (S1), a need for data transfer arises, the user of the portable telephone 13 performs a data transfer start request operation (S2).

If the portable telephone 13 is ready to start data transfer, a user-user information transfer procedure is initiated in accordance with the standard RCR-STD-27D, and an FAC (service 3 request) message is transmitted to the portable telephone 19. In reply to this message, the portable telephone 19 transmits an acceptance FAC (service 3 acceptance) message (S3).

On receiving the FAC (service 3 acceptance) message, the portable telephone 13 creates a USER-INFO message in which is set a transfer start request for the portable telephone 19, and transmits the same message (S4). The portable telephone 19, upon receiving the USER-INFO message, analyzes the contents thereof, and if this message is indicative of the transfer start request, it displays "TRANSFER START" on the liquid crystal display screen 13j (S5).

The user of the portable telephone 19 then performs an approval operation to accept data transfer (S6), whereupon the portable telephone 19 transmits a USER-INFO message indicative of acceptance of the start of data transfer, to the portable telephone 13 (S7).

On receiving this USER-INFO message, the portable telephone 13 executes a data transfer procedure, described in detail later, with respect to the portable telephone 19 (S8).

When the portable telephone 13 is thereafter notified by user operation of the completion of data transfer (S9), the portable telephone 13 transmits a USER-INFO message in which is set the end of transfer, to the portable telephone 19 (S10). Upon receiving this message, the portable telephone 19 displays "TRANSFER COMPLETED" on the liquid crystal display screen 13j (S11).

The portable telephone 19 then transmits a USER-INFO message in which a response to the end of transfer is set to the portable telephone 13 (S12). After receiving this USER-INFO message, the portable telephone 13 performs a data transfer termination process, and then resumes a telephone communication state (S13).

Referring now to FIG. 7 through FIG. 14, a specific data transfer process performed between the portable telephones 13 and 19 will be described.

FIGS. 7 through 14 are flowcharts showing the entire process, that is, from the beginning to the end, of data transfer between the portable telephones 13 and 19. Among these FIGS. 7 to 14, FIGS. 7 to 10 illustrate the contents of a process executed by the portable telephone 13 of the data transmitting side, and FIGS. 11 to 14 illustrate the contents of a process executed by the data receiving-side portable telephone 19. In the following, explanation is given in accordance with the data transfer procedure, with reference to the step (S) numbers shown in FIGS. 7 through 14 where appropriate.

Figure 7:
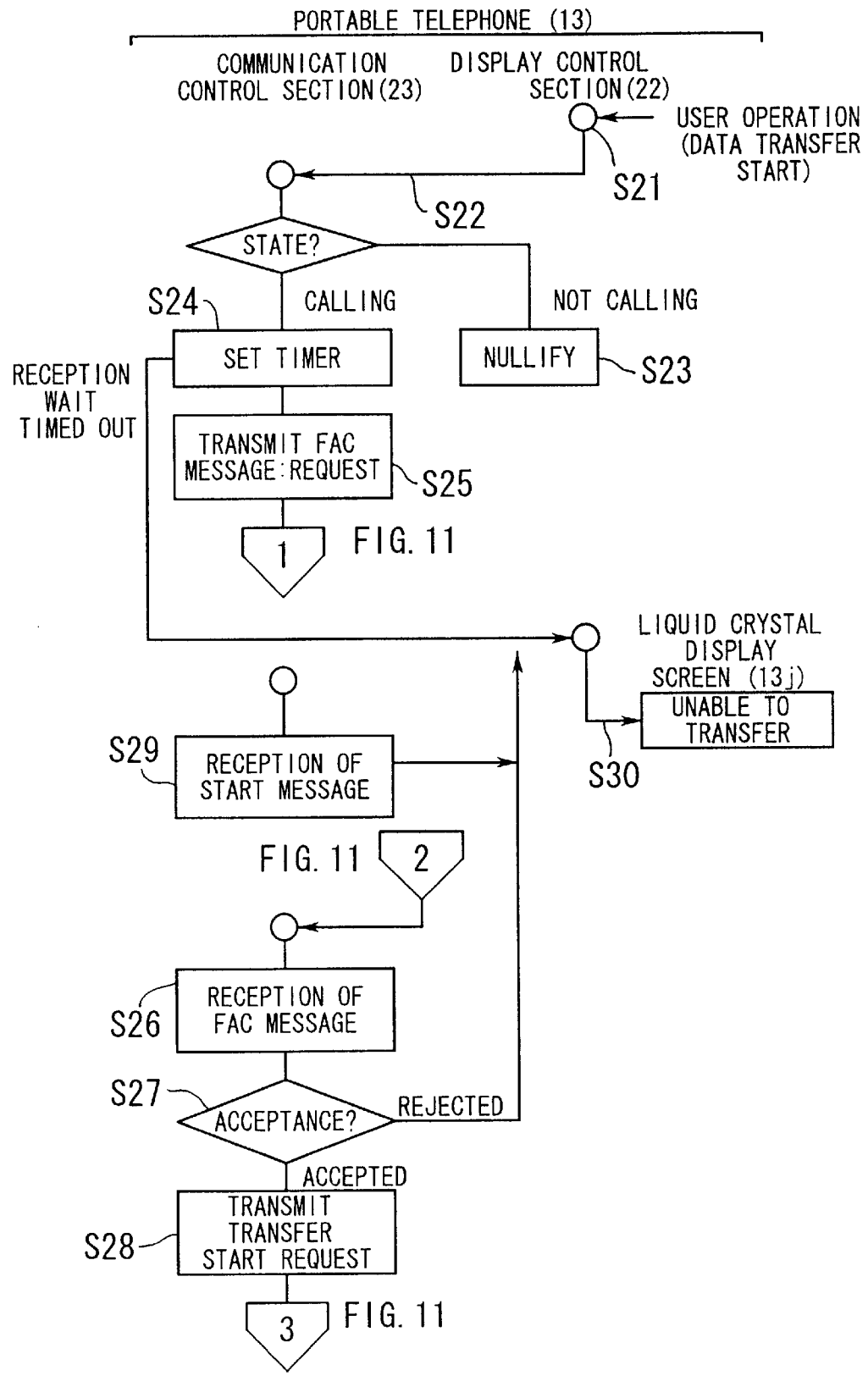
FIG. 7 is a flowchart showing a first part of a data transfer process executed by a portable telephone of a data transmitting side.

Referring first to FIGS. 7 and 11, a process corresponding to Steps S1 through S5 shown in FIG. 6 will be explained.

If a need for data transfer arises during a vocal communication state, a user operation requesting a start of data transfer is performed on the portable telephone 13 (S21 in FIG. 7). The user operation through the display operation section 13i is detected by the display control section 22 of the portable telephone 13, whereupon the display control section 22 notifies the communication control section 23 of a data transfer request (S22 in FIG. 7). The communication control section 23, which has received the data transfer request, nullifies this message (S23 in FIG. 7) if the portable telephone 13 is not in a state (calling state) in which data transfer can be started. On the other hand, if the portable telephone 13 is in the state in which data transfer can be started, the user-user information transfer procedure is initiated in accordance with the standard RCR-STD-27D, whereupon a reception wait timer is started to measure time (S24 in FIG. 7) and also an FAC (service 3 request) message is transmitted to the portable telephone 19 (S25 in FIG. 7).

On receiving the FAC (service 3 request) message (S31 in FIG. 11), the communication control section of the receiving side portable telephone 19 determines whether or not user-user information transfer service is permitted. If the service is permitted, a responsive FAC (service 3 acceptance) message indicative of acceptance is sent to the portable telephone 13 (S32 in FIG. 11). If the service is not permitted, an FAC (service 3 rejection) message is sent to the portable telephone 13 (S33 in FIG. 11), and also the FAC (service 3 request) message is nullified (S34 in FIG. 11).

In the case where the FAC (service 3 acceptance) message is received from the portable telephone 19 (S26, S27 in FIG.

7), the communication control section 23 of the portable telephone 13 creates a USER-INFO message in which is set a transfer start request and then transmits the message to the portable telephone 19 (S28 in FIG. 7). On the other hand, where the FAC (service 3 rejection) message is received (S26, S27 in FIG. 7), the communication control section 23 provides the display control section 22 with information indicative of the inability of data transfer. The display control section 22 then displays the information on the liquid crystal display screen 13j (S30 in FIG. 7).

In the event the user-user information transfer service is not provided by the network, the network sends back an STAT message (S29 in FIG. 7). The communication control section 23 then provides the display control section 22 with information indicative of the reason for unavailability of the service, which is set in the STAT message, and the display control section 22 displays the information on the liquid crystal display screen 13j (S30 in FIG. 7). Also in the case where no FAC (service 3 acceptance) message is received from the portable telephone 19 even though the reception wait timer started in Step S24 (FIG. 7) has completed the measurement of a predetermined time (the measurement timed out), the communication control section 23 provides the display control section 22 with information indicative of the inability of data transfer.

On receiving the transfer inability information, the display control section 22 displays a message indicative of the inability of data transfer on the liquid crystal display screen 13j of the portable telephone 13; in this case, a predefined sound may be emitted in a manner timed with the message display.

When the USER-INFO message is received from the portable telephone 13 (S35 in FIG. 11), the communication control section of the portable telephone 19 analyzes the contents of the USER-INFO message and, if this message is indicative of the transfer start request, notifies the display control section of the data transfer start request. In accordance with the notification, "TRANSFER START" is displayed on the liquid crystal display screen (S36 in FIG. 11).

Referring now to FIGS. 12, 8, 9 and 13, a process corresponding to Steps S6 to S8 shown in FIG. 6 will be explained.

Figure 12:
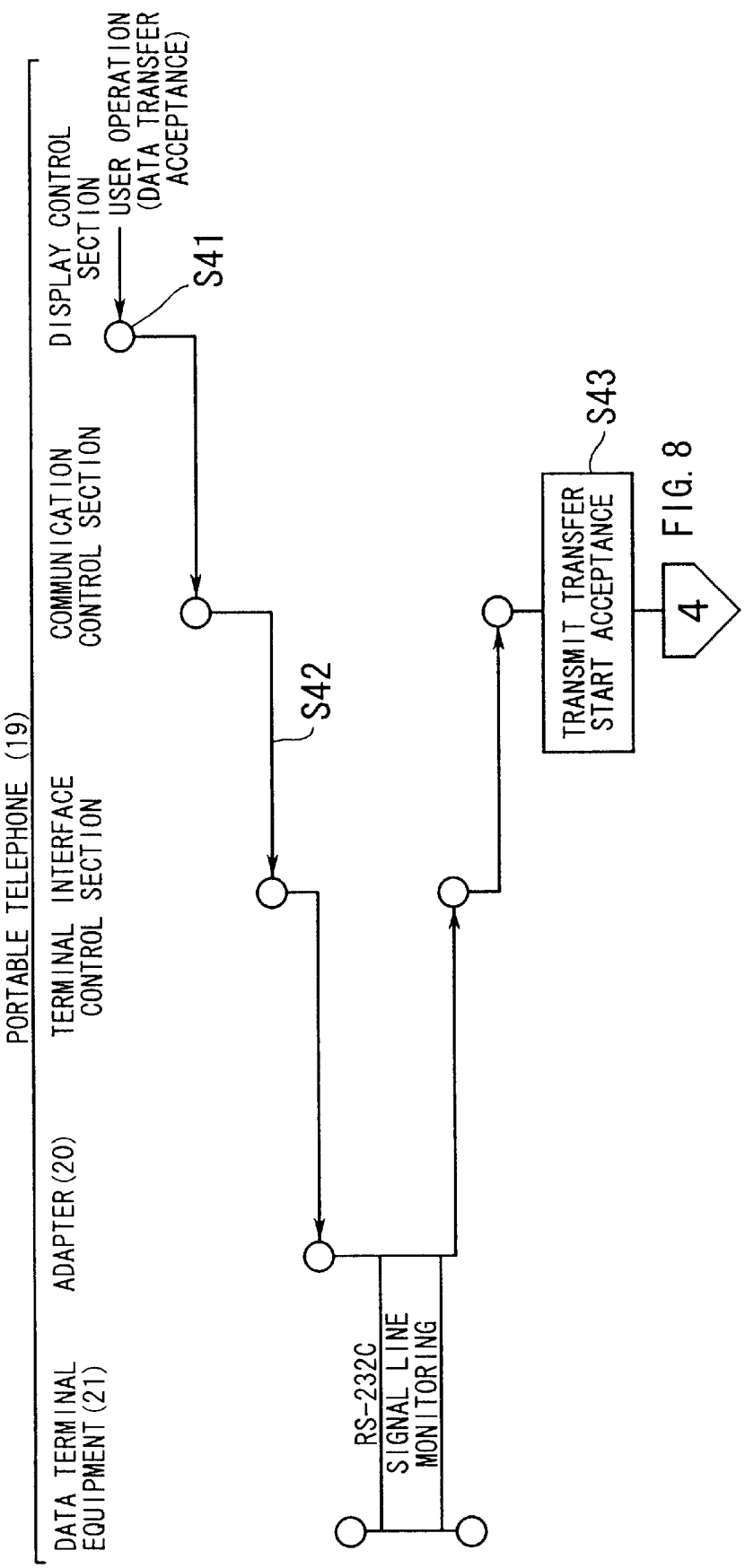
FIG. 12 is a flowchart showing a second part of the data transfer process executed by the data receiving-side portable telephone.
Figure 13:
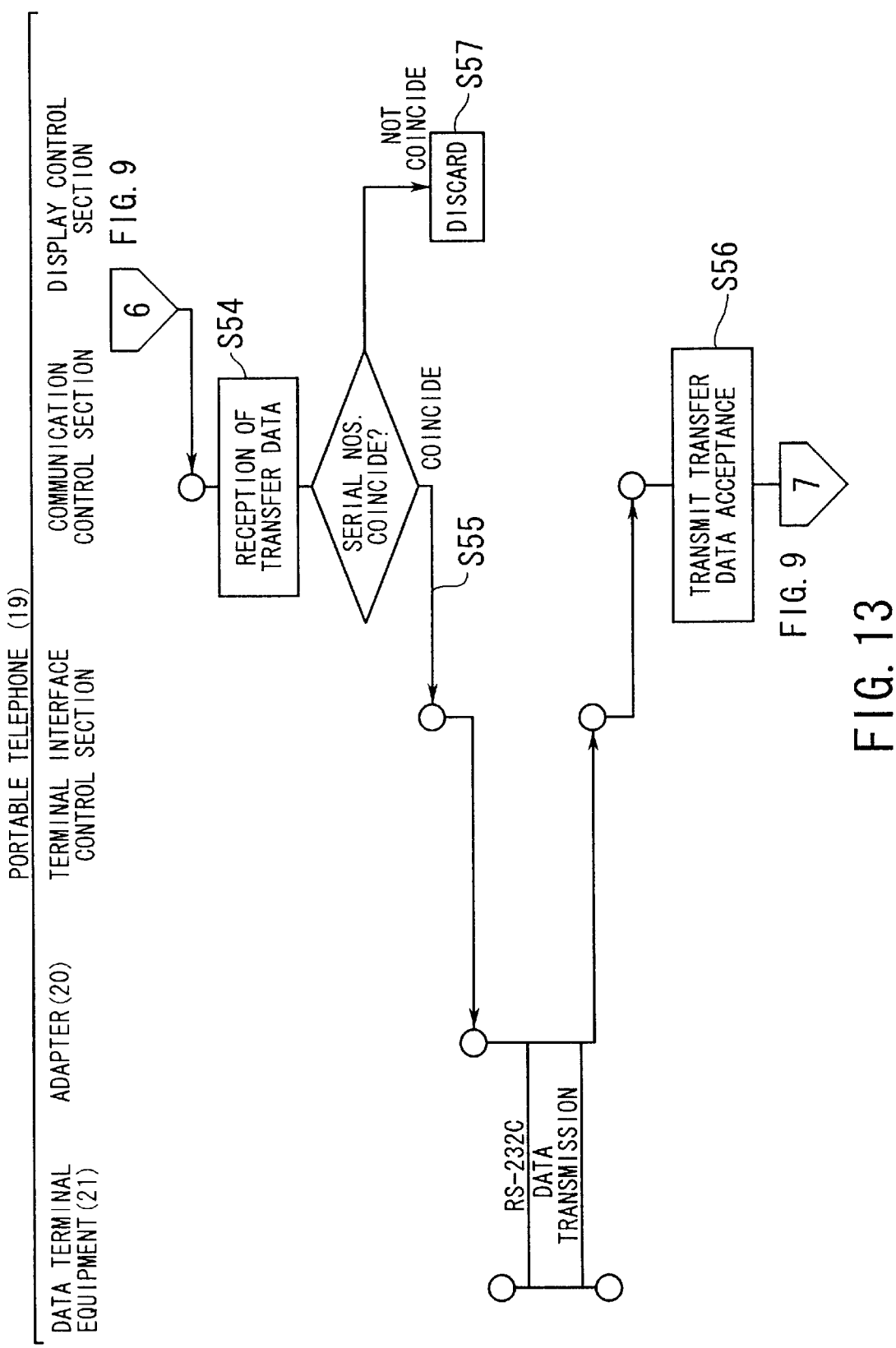
FIG. 13 is a flowchart showing a third part of the data transfer process executed by the data receiving-side portable telephone.

If, after viewing the information displayed on the liquid crystal display screen of the portable telephone 19, the user of the portable telephone 19 performs a data transfer acceptance operation (S41 in FIG. 12), the communication control section of the portable telephone 19 sends a request for preparation of the data transfer start to the terminal interface control section (S42 in FIG. 12) and also transmits a responsive USER-INFO message indicative of acceptance of the transfer start request to the portable telephone 13 (S43 in FIG. 12).

Figure 8:
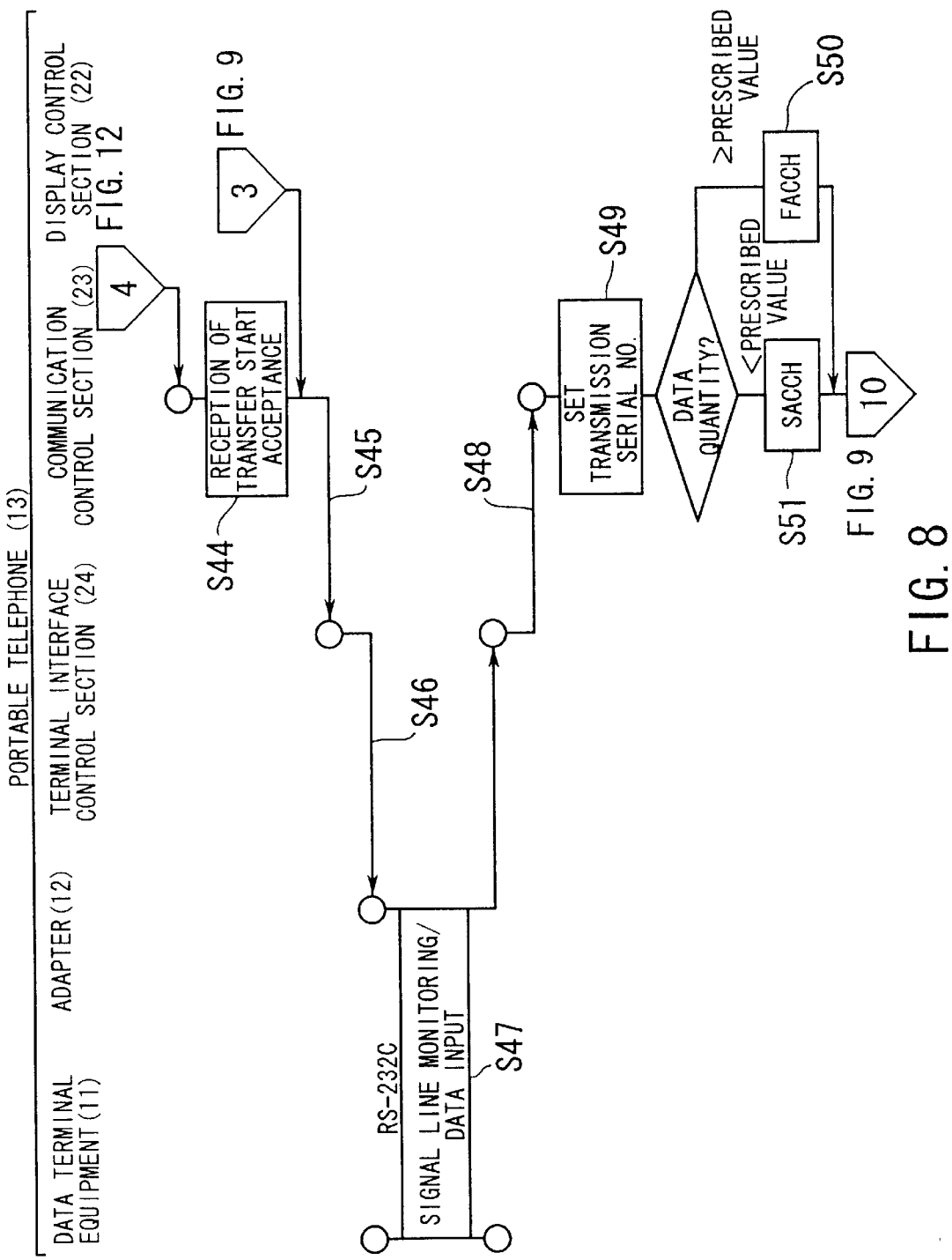
FIG. 8 is a flowchart showing a second part of the data transfer process executed by the data transmitting-side portable telephone.

Upon receiving the responsive USER-INFO message indicative of acceptance of the transfer start request from the portable telephone 19 (S44 in FIG. 8), the portable telephone 13 sends a data input request to the terminal interface control section 24 (S45 in FIG. 8). When supplied with the data input request, the terminal interface control section 24 sends a data transfer request to the adapter 12 (S46 in FIG. 8). The adapter 12 then starts fetching data from the data terminal equipment 11 in accordance with the RS-232C interface standard (S47 in FIG. 8). The data input from the data terminal equipment 11 to the terminal interface control section 24 via the adapter 12 is stored in a storage area of the memory 13h. The terminal interface control section 24 then informs the communication control section 23 that the data has been transferred (S48 in FIG. 8).

The communication control section 23, which has thus been notified of the transfer of data, creates a USER-INFO message in which the transfer data is set, and transmits the message to the portable telephone 19; in this case, the communication control section 23 sets a transmission serial number for the transfer data (S49 in FIG. 8) and at the same time compares the quantity of the data stored in the storage area of the memory 13h with a prescribed value. If the data quantity is larger than or equal to the prescribed value, the communication control section 23 selects the fast associated control channel FACCH (S50 in FIG. 8), and if the data quantity is smaller than the prescribed value, the control section 23 selects the slow associated control channel SACCH (S51 in FIG. 8). Using the selected channel, the communication control section 23 starts the data transfer (S52 in FIG. 9) and at the same time starts a transfer acceptance wait timer to measure time (S53 in FIG. 9). The prescribed value is stored in a ROM inside the portable telephone as information specific thereto, and is loaded from the ROM into the memory 13h when the power supply to the portable telephone is turned on.

The selection of one of the fast and slow associated control channels FACCH and SACCH may alternatively be made by a method described later with reference to FIG. 16.

On receiving the USER-INFO message in which the transfer data is set (S54 in FIG. 13), the communication control section of the portable telephone 19 compares the transmission serial number set with respect to the transfer data in the USER-INFO message with a corresponding reception serial number. As a result of comparison, if the two numbers coincide, the transfer data is sent to the terminal interface control section (S55 in FIG. 13), which then transmits the transfer data to the data terminal equipment 21 via the adapter 20. After the communication control section is informed that the transfer data has reached the data terminal equipment 21, it transmits a USER-INFO message in which is set a transfer data acceptance, to the portable telephone 13 (S56 in FIG. 13). In this transfer data acceptance, a serial number identical with the reception serial number (=transmission serial number) is set. If the aforementioned comparison indicates that the two serial numbers do not coincide, the received transfer data is discarded (S57 in FIG. 13).

After the USER-INFO message in which the transfer data acceptance is set is received (S58 in FIG. 9), the communication control section 23 of the portable telephone 13 compares the serial number set in the transfer data acceptance with the transmission serial number retained thereby. If the two numbers coincide, the flow proceeds to Step S45 in FIG. 8 to read succeeding data, and if the numbers do not coincide, the flow proceeds to Step S59 in FIG. 9. In Step S59, the value of a retransmission counter, which counts the number of times the retransmission is executed, is incremented.

Figure 9:
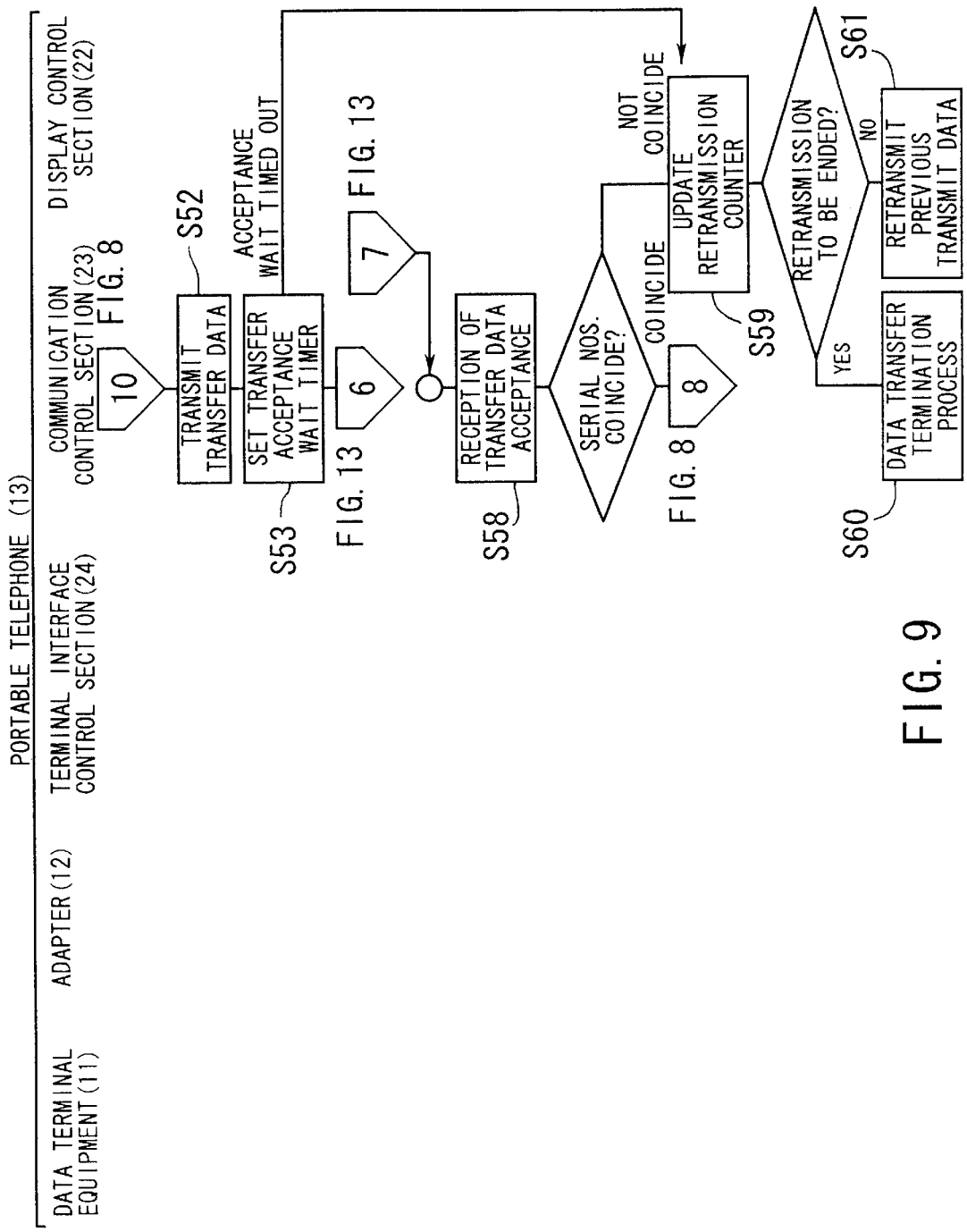
FIG. 9 is a flowchart showing a third part of the data transfer process executed by the data transmitting-side portable telephone.

Also in the case where no USER-INFO message having transfer data acceptance set therein is received even though the transfer acceptance wait timer started in Step S53 in FIG. 9 has completed the measurement of a predetermined time, the value of the retransmission counter is incremented (S59 in FIG. 9). When the count value of the retransmission counter has reached a predetermined value, the data transfer termination process is performed (S60 in FIG. 9). In this case, the call is not cleared. On the other hand, in cases where the predetermined value is still not reached by the count of the retransmission counter, the previous transmit data is retransmitted (S61 in FIG. 9).

Error control other than that described above is performed through control of layer 2 as prescribed by the standard RCR-STD-27D.

Figure 10:
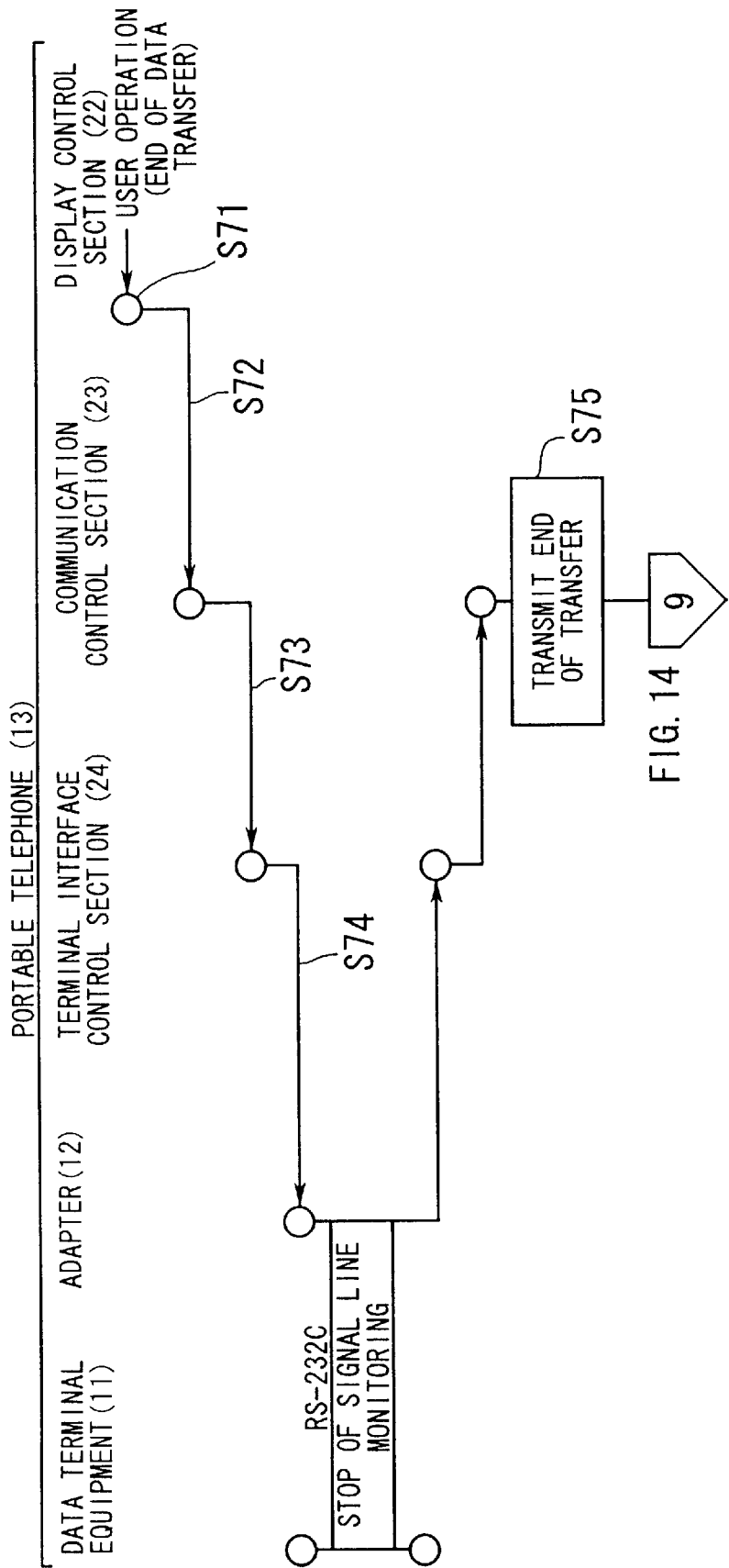
FIG. 10 is a flowchart showing a fourth part of the data transfer process executed by the data transmitting-side portable telephone.
Figure 14:
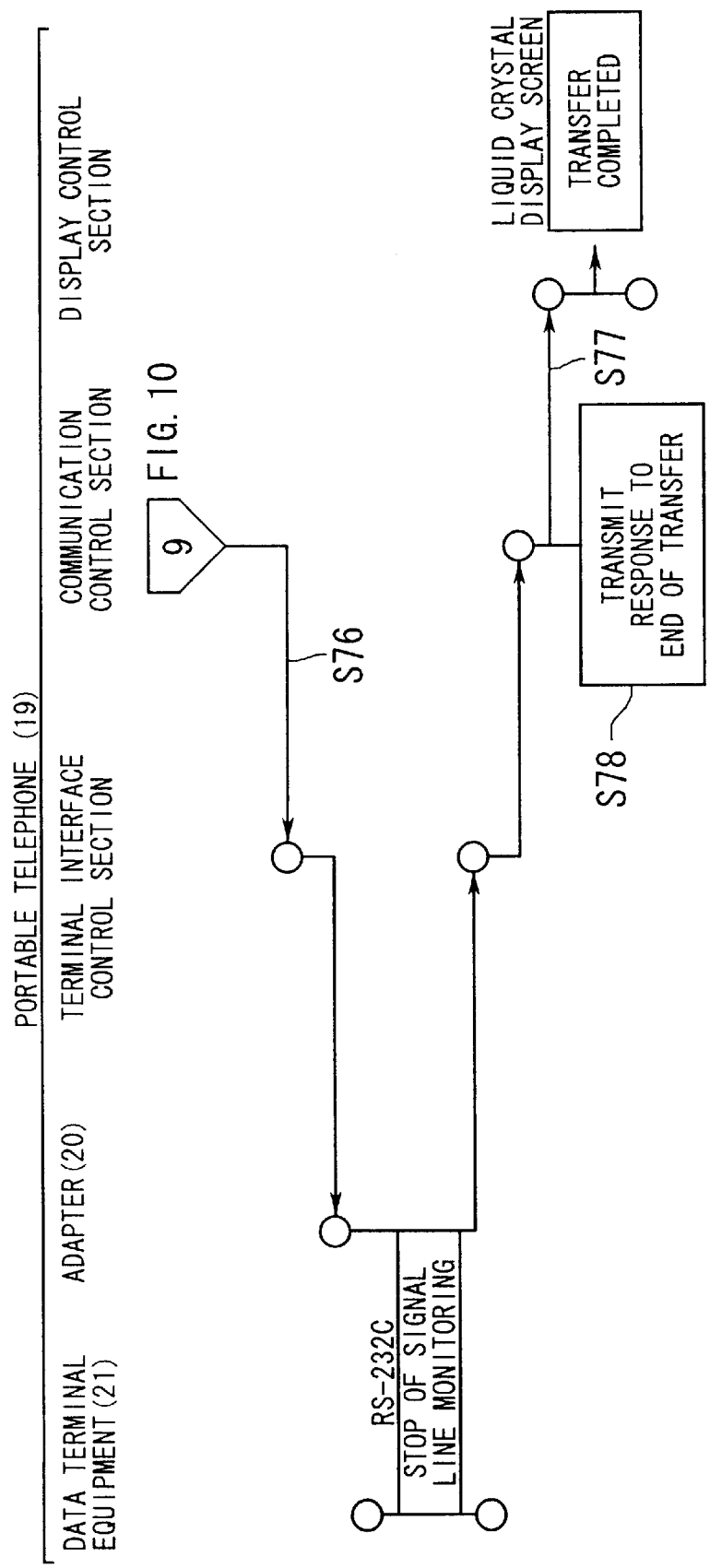
FIG. 14 is a flowchart showing a fourth part of the data transfer process executed by the data receiving-side portable telephone.

Referring now to FIGS. 10 and 14, a process corresponding to Steps S9 through S13 shown in FIG. 6 will be explained.

When the display operation section 13i of the portable telephone 13 is notified by user operation of the end of data transfer (S71 in FIG. 10), the display control section 22 informs the communication control section 23 of the end of data transfer (S72 in FIG. 10). The communication control section 23, which has thus been notified by the display control section 22 of the end of data transfer, informs the terminal interface control section 24 of the end of data transfer (S73 in FIG. 10), and then the terminal interface control section 24 notifies the adapter 12 that the process of reading data from the data terminal equipment 11 is to be stopped (S74 in FIG. 10). The adapter 12 regulates the inflow of data in accordance with the RS-232C interface standard.

On completion of the above process, the communication control section 23 receives a response indicative of the completion of the process, and then transmits a USER-INFO message in which is set an end of transfer, to the portable telephone 19 (S75 in FIG. 10).

When informed of the end of transfer, the communication control section of the portable telephone 19 notifies the terminal interface control section and the display control section individually of the end of transfer (S76, S77 in FIG. 14), and then transmits a USER-INFO message in which is set a response to the end of transfer, to the portable telephone 13 (S78 in FIG. 14).

The terminal interface control section and the display control section, which have thus been informed of the end of transfer, carry out a data transfer termination process similar to that performed in the portable telephone 13. As a result, the portable telephone 19 normally resumes the telephone communication mode.

In situations where the communication cannot be continued due to interruption of the radio wave, for example, or a DISC message requesting call clearing is received from the portable telephone 13, a call clearing process is performed following the data transfer termination process. This will be explained later with reference to FIGS. 17 and 18.

FIG. 15 is a diagram showing a USER-INFO message format. Each row consists of 8 bits, and the format can be defined as a USER-INFO message by setting the code "00100000" in the field "MESSAGE TYPE" at the third row.

Figure 16:
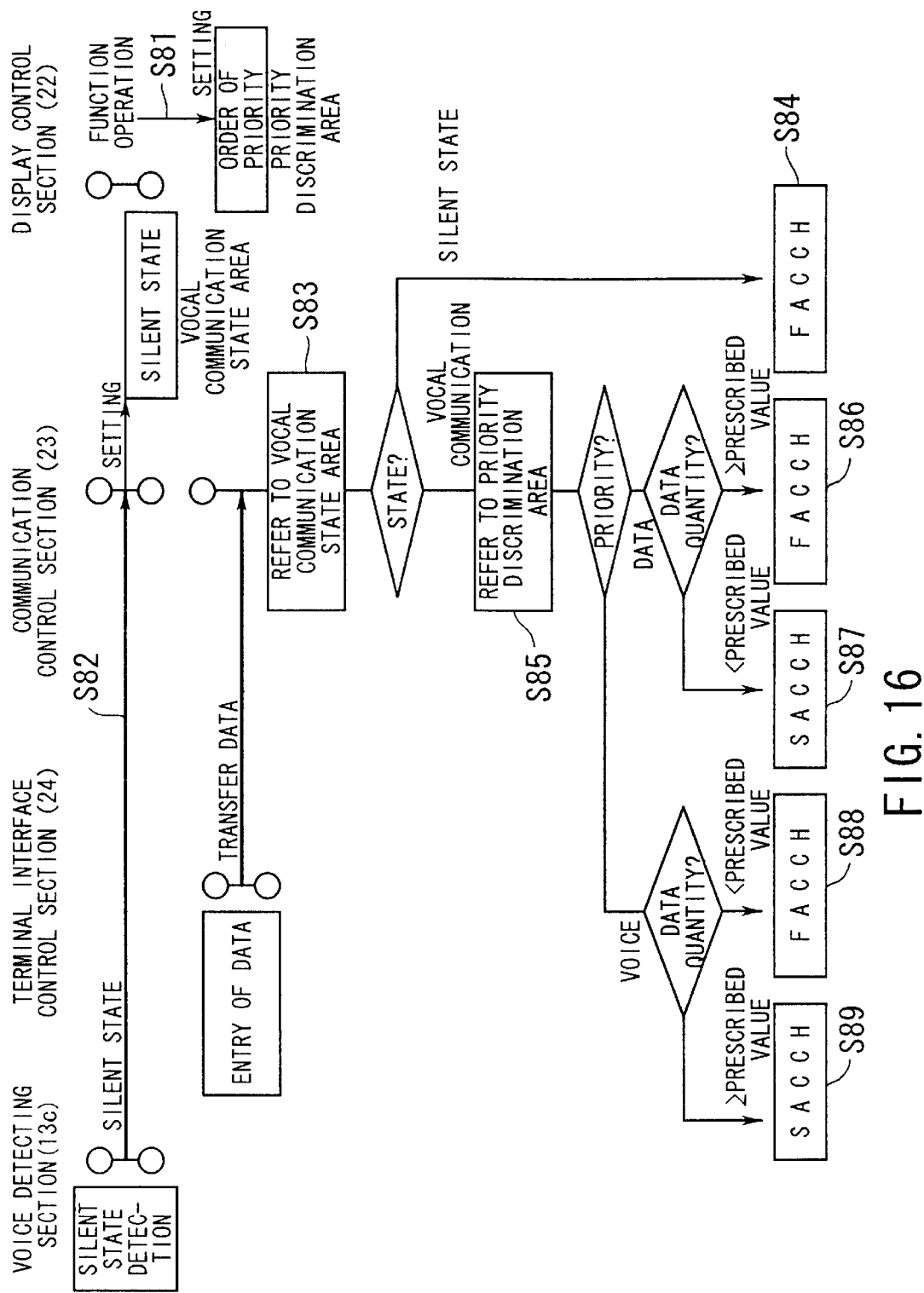
FIG. 16 is a chart illustrating a transmission channel determination method different from that employed in Steps S50 and S51 in FIG. 8.

FIG. 16 is a chart illustrating another method of determining the transmission channel, which method is different from that explained with reference to Steps S50 and S51 shown in FIG. 8.

Specifically, a function operation is previously performed by the user with respect to the display operation section 13i of the portable telephone 13, and as a result, priority discrimination information is stored in a priority discrimination area in the memory 13h by means of the display control section 22 (S81). The priority discrimination information indicates which of vocal communication and data transfer is to be given priority.

Also, the voice detecting section 13c in the portable telephone 13 monitors a silent state during vocal communication by a suitable means known in the art (e.g., by reception level measurement). On detecting a silent state, the voice detecting section 13c informs the communication control section 23 of the silent state (S82), whereupon the communication control section 23 sets "SILENT STATE" in a vocal communication state area in the memory 13h. When voice is detected by the voice detecting section 13c, "VOCAL COMMUNICATION" is set in the vocal communication state area in the memory 13h.

The communication control section 23 refers to the vocal communication state area in the memory 13h (S83), and if "SILENT STATE" is set, it notifies the radio control section 13e that the USER-INFO message shall be transmitted by using the fast associated control channel FACCH (S84).

On the other hand, if "VOCAL COMMUNICATION" is set in the vocal communication state area, the communication control section 23 determines the transmission channel by referring to the transfer data quantity notified from the terminal interface control section 24 and the priority discrimination information (S85) stored in the priority discrimination area in the memory 13h. Specifically, if the data transfer is specified by the priority discrimination information and at the same time the transfer data quantity is larger than or equal to a prescribed value, the fast associated control channel FACCH is selected (S86). If the data transfer is specified by the priority discrimination information and at the same time the transfer data quantity is smaller than the prescribed value, the slow associated control channel SACCH is selected (S87). If, on the other hand, the vocal communication is specified by the priority discrimination information and at the same time the transfer data quantity is smaller than the prescribed value, the fast associated control channel FACCH is selected (S88). If the vocal communication is specified by the priority discrimination information and at the same time the transfer data quantity is larger than or equal to the prescribed value, the slow associated control channel SACCH is selected (S89).

The communication control section 23 notifies the radio control section 13e that the USER-INFO message shall be transmitted by using the transmission channel selected in this manner.

Figure 17:
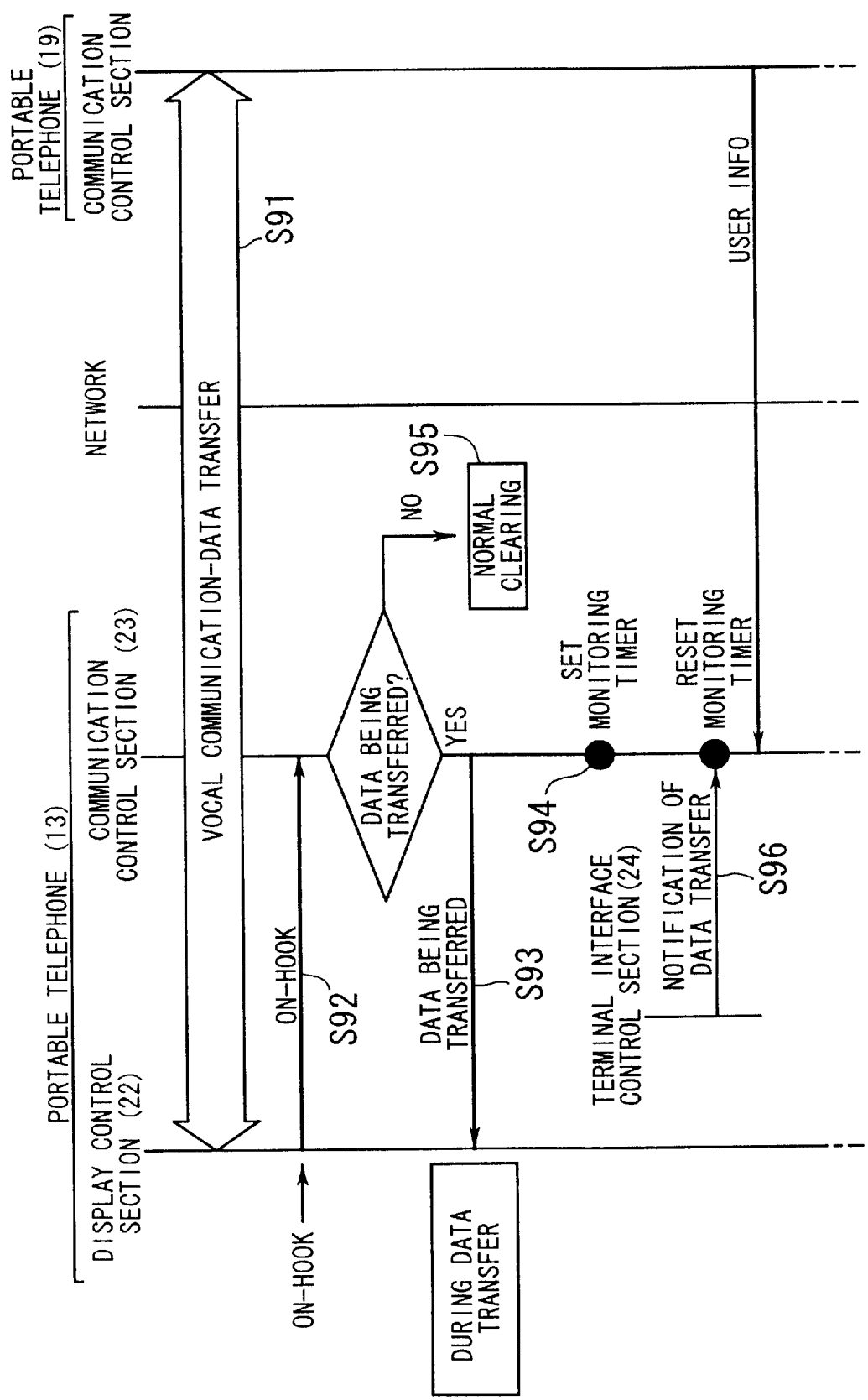
FIG. 17 is a chart showing the former half of a non-communication monitoring procedure.
Figure 18:
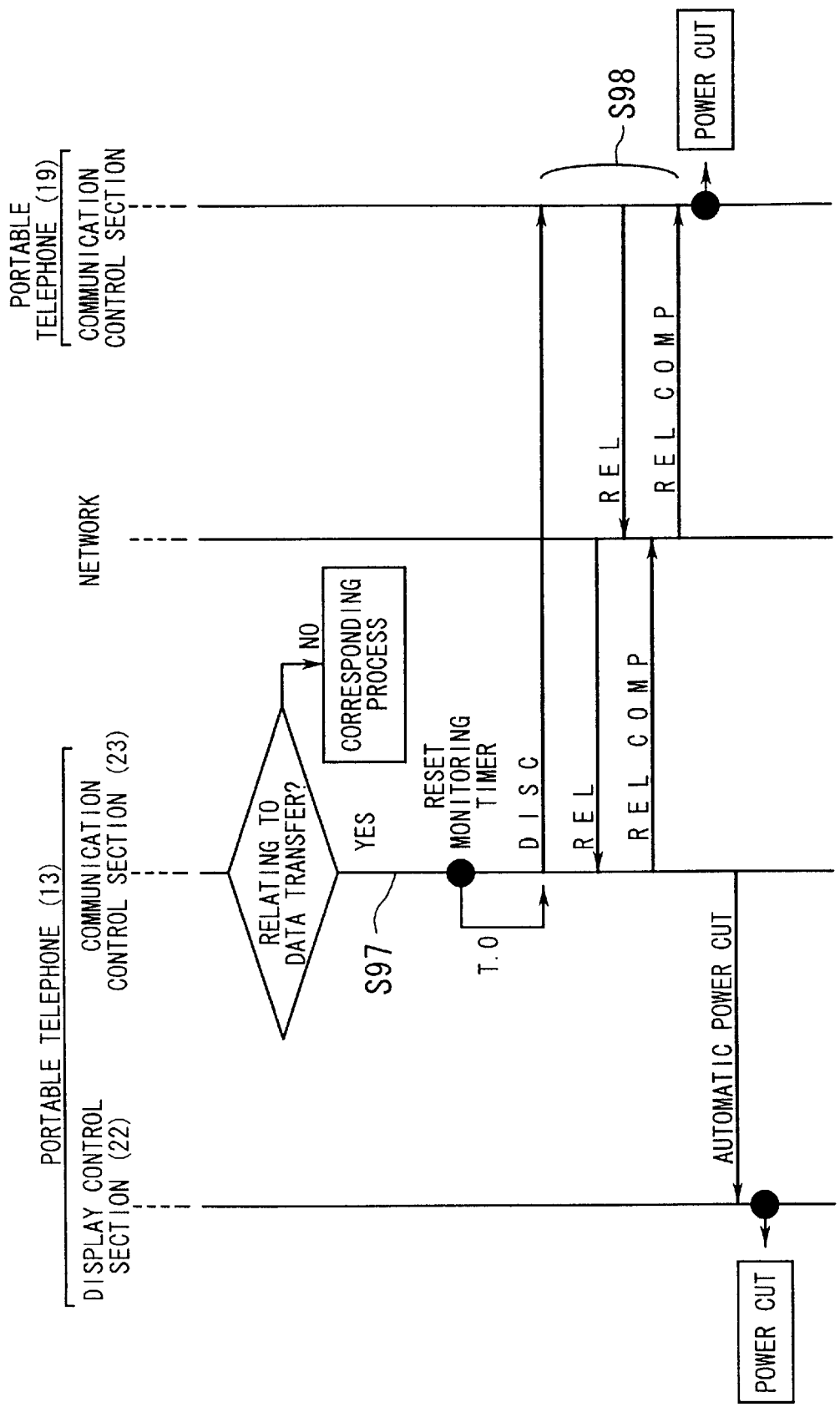
FIG. 18 is a chart showing the latter half of the non-communication monitoring procedure.

Referring now to FIGS. 17 and 18, a process from the data transfer state to the end of communication will be explained in detail.

FIGS. 17 and 18 are charts illustrating a non-communication monitoring procedure, wherein FIG. 17 shows the former half of the procedure and FIG. 18 shows the latter half of the same.

If a user operation (e.g., on-hook) is performed with respect to the display operation section 13i of the portable telephone 13 while vocal communication and data transfer are executed simultaneously (S91), such an operation is detected by the display control section 22, which then notifies the communication control section 23 of the user operation (S92).

The communication control section 23, which has thus been notified of the on-hook, operates depending on the current state. Specifically, if the data transfer is going on, the communication control section 23 notifies the display control section 22 that the data transfer is under execution (S93) and at the same time starts a monitoring timer to measure time (S94). On the other hand, if no data transfer is going on, a normal clearing process is performed (S95). The display control section 22, which has been notified that the data transfer is under execution, causes the liquid crystal display screen 13j to display "DATA BEING TRANSFERRED" thereon. At this time, an alarm may be sounded simultaneously.

The monitoring timer is set again when the communication control section 23 is notified of data transfer from the terminal interface control section 24 (S96), or when a USER-INFO message is received from the portable telephone 19 and, as a result of analysis, the received message is found to be related to data transfer (S97). The communication control section 23 stops the time measurement by the monitoring timer when it is notified from the display control section 22 that a user operation (e.g., off-hook) has been performed with respect to the display operation section 13i.

When the measurement by the monitoring timer has timed out, the communication control section 23 of the portable telephone 13 exchanges a DISC message, an REL message and an REL-COMP message with the portable telephone 19, and then performs a clearing process (S98). The REL message is a call release message, and the REL-COMP message is a call release completion message.

In the case where automatic power cut is set beforehand, the communication control section 23 of the portable telephone 13 notifies the display control section 22 of the automatic power cut after the clearing process. The display control section 22, which has thus been notified of the automatic power cut, cuts the power supply to the portable telephone 13 according to an ordinary procedure. The automatic power cut is set as part of the control information, as described later, by means of a user's function operation.

Also in the portable telephone 19, the communication control section, which has received the DISC message during the non-communication monitoring state, performs the clearing process and, if the automatic power cut is set beforehand, cuts the power supply to the portable telephone 19 according to the same procedure as in the portable telephone 13.

Referring now to FIGS. 19 through 22, an inflow regulation process, which is executed when transmission of transfer data from the transmitting side needs to be regulated because of failure of the transfer data-receiving side to perform the reception process, will be explained.

Figure 19:
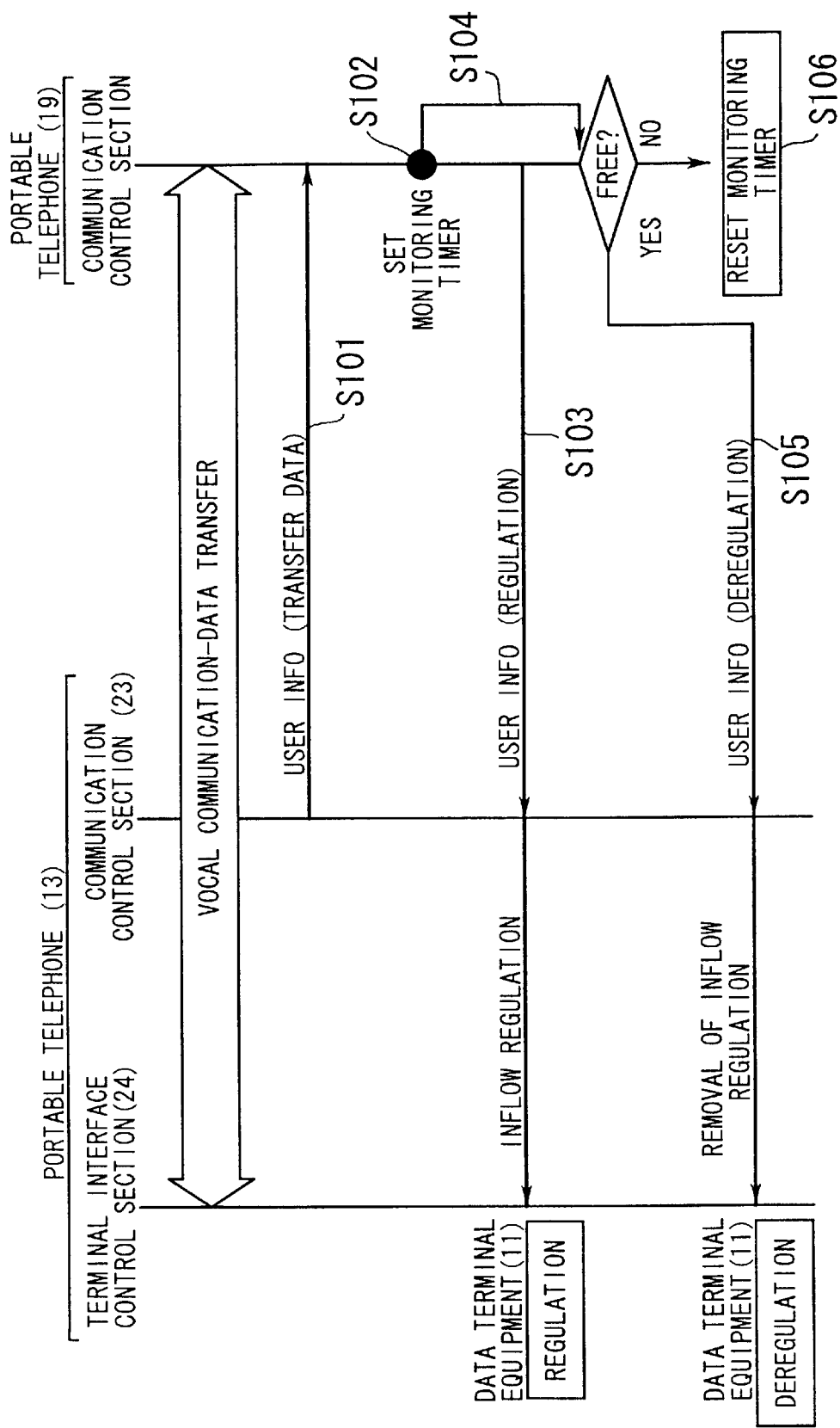
FIG. 19 is a sequence diagram illustrating an inflow regulation on portable telephones.
Figure 20:
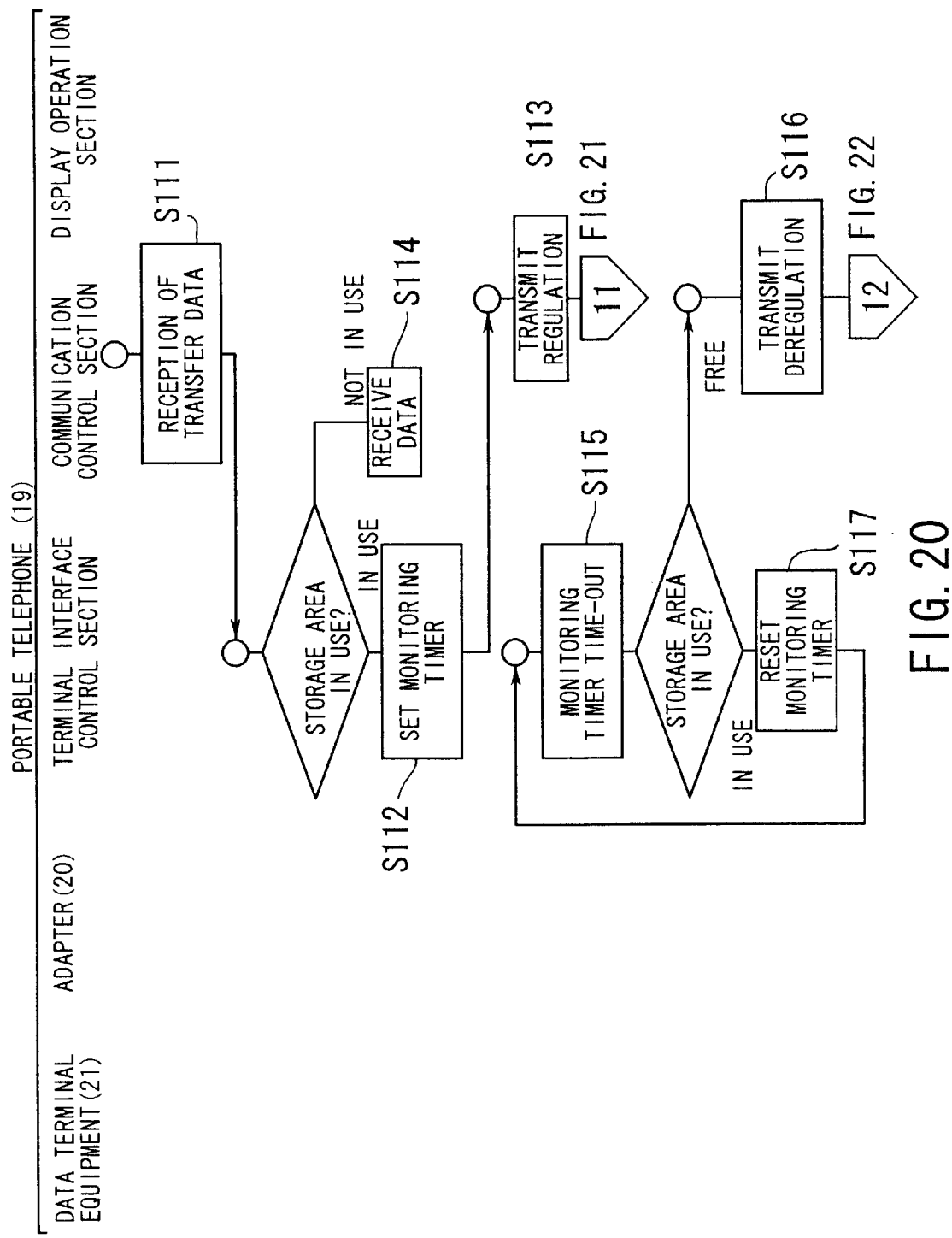
FIG. 20 is a flowchart showing a regulation process executed by a portable telephone of a transfer data-receiving side.
Figure 21:
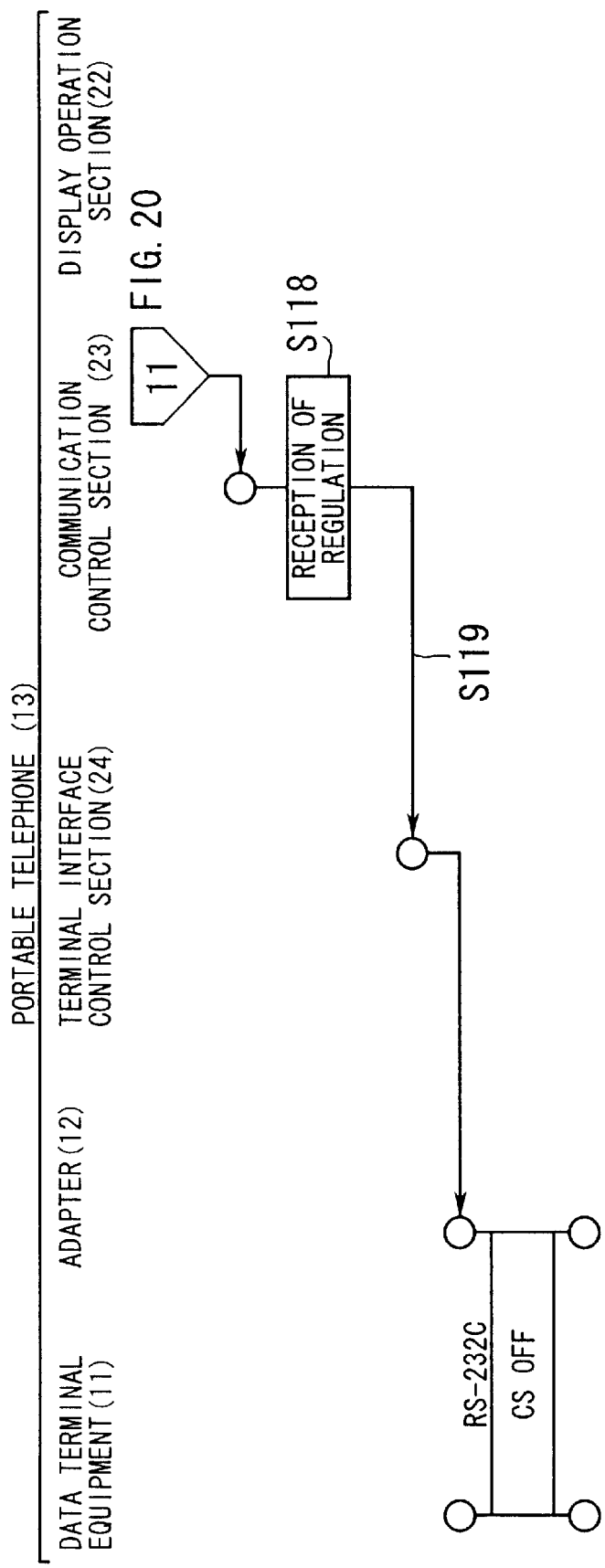
FIG. 21 is a flowchart showing a regulation initiation process executed by a portable telephone of a transfer data-transmitting side.
Figure 22:
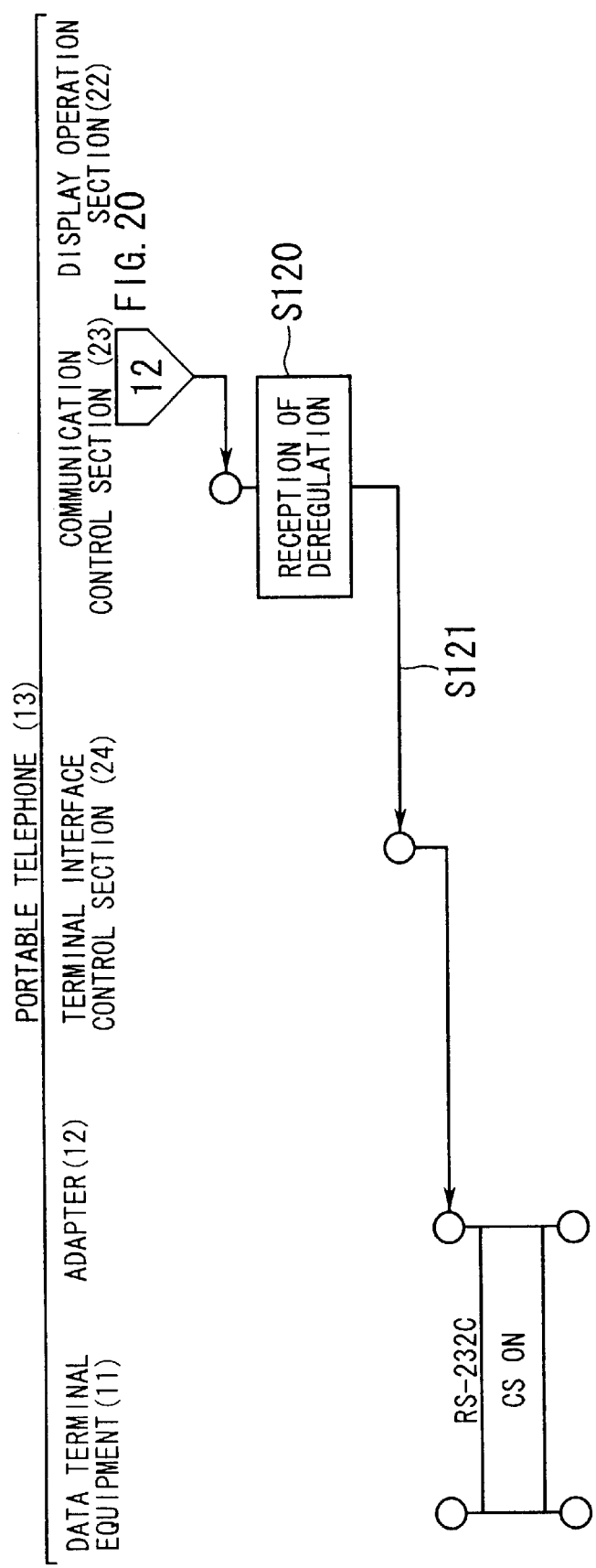
FIG. 22 is a flowchart showing a deregulation process executed by the transfer data-transmitting side portable telephone.

FIG. 19 is a sequence diagram illustrating the inflow regulation placed on communication between the portable telephones 13 and 19, FIG. 20 is a flowchart showing a regulation process executed by the transfer data-receiving side portable telephone 19, FIG. 21 is a flowchart showing a regulation initiation process executed by the transfer data-transmitting side portable telephone 13, and FIG. 22 is a flowchart showing a deregulation process executed by the transfer data-transmitting side portable telephone 13. In the following, explanation is given with reference to the step (S) numbers shown in FIGS. 19 through 22 where appropriate.

When supplied with transfer data from the portable telephone 13 (S101 in FIG. 19; S111 in FIG. 20), the terminal interface control section of the portable telephone 19 stores the transfer data received from the communication control section in the storage area in the memory. At this time, if the process for outputting the previously received transfer data has not yet been completed, the monitoring timer is started to measure time (S102 in FIG. 19; S112 in FIG. 20) and at the same time a USER-INFO message in which regulation is set is transmitted to the portable telephone 13 (S103 in FIG. 19; S113 in FIG. 20). If the transfer data output process is completed, the succeeding transfer data is received (S114 in FIG. 20).

When the measurement by the monitoring timer has timed out (S115 in FIG. 20), the storage area in the memory is referred to (S104 in FIG. 19), and if the storage area is free, a USER-INFO message in which deregulation is set is transmitted to the portable telephone 13 (S105 in FIG. 19; S116 in FIG. 20). If the storage area in the memory is not free when the measurement by the monitoring timer has timed out, the monitoring timer is restarted for time measurement (S106 in FIG. 19; S117 in FIG. 20).

On receiving the USER-INFO message in which the regulation is set (S118 in FIG. 21), the communication control section 23 of the portable telephone 13 notifies the terminal interface control section 24 of inflow regulation (S119 in FIG. 21). The terminal interface control section 24, which has thus been informed of the inflow regulation, interrupts the reading of data from the data terminal equipment 11.

When the USER-INFO message in which the deregulation is set is received (S120 in FIG. 22), the communication control section 23 of the portable telephone 13 informs the terminal interface control section 24 of removal of the inflow regulation (S121 in FIG. 22). The terminal interface control section 24, which has thus been notified of the removal of the inflow regulation, restarts to read data.

The regulation/deregulation on data read from the data terminal equipment 11 is notified from the terminal interface control section 24 to the adapter 12.

A control information transfer procedure will be now explained.

When a user operation is performed in Step S2 or S9 in FIG. 6, sounding pattern, sound volume level, messaging on the liquid crystal display screen, automatic power cut, vibrator function, process priority, etc. can be set as needed.

Such portable telephone operations can be set by means of user operation performed on the display operation section 13i of the portable telephone 13. The display control section 22 converts the set operation into control information and notifies the communication control section 23 of the information.

Upon receiving the control information, the communication control section 23 sets the received control information in the field "CONTROL INFORMATION/TRANSFER DATA" in the USER-INFO message format shown in FIG. 15, and transmits the control information to the portable telephone 19.

The communication control section in the portable telephone 19 sends the thus-notified control information to the display control section. In accordance with the control information, the display control section determines the operation of the portable telephone.

In the case where no control information is set, the process relating to the operation of the portable telephone is not performed, and "INFORMATION TRANSFER START" is displayed on the liquid crystal display screen. Simultaneously with this, an alarm may be sounded.

On the other hand, in the case where a restrictive condition (e.g., sound volume turnoff) is set on the operation of the portable telephone 19 but the process priority set in the control information is not "TOP PRIORITY", the control information concerning the restrictive condition is regarded as invalid and is discarded.

Figure 23:
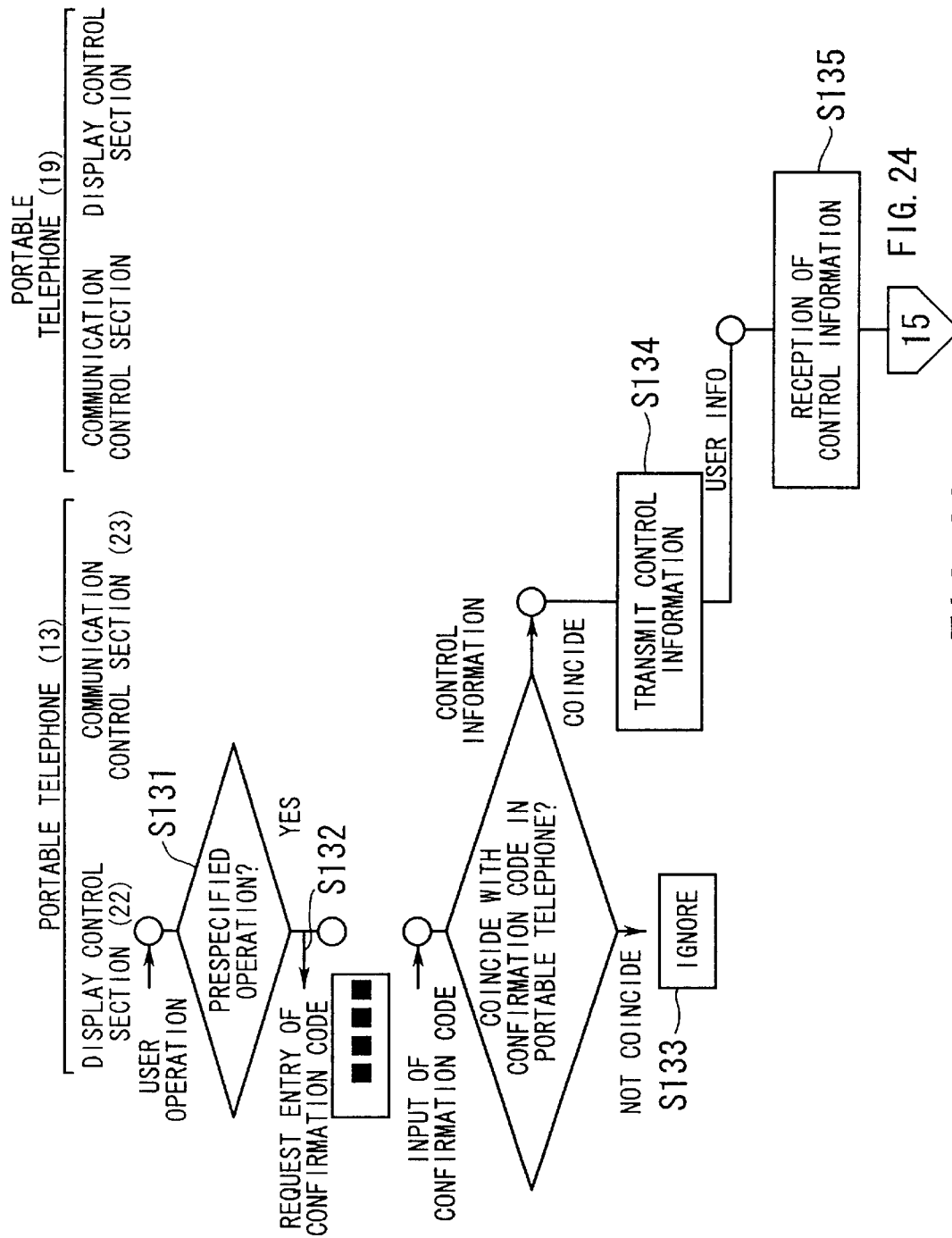
FIG. 23 is a flowchart showing the former half of an authentication procedure.
Figure 25:
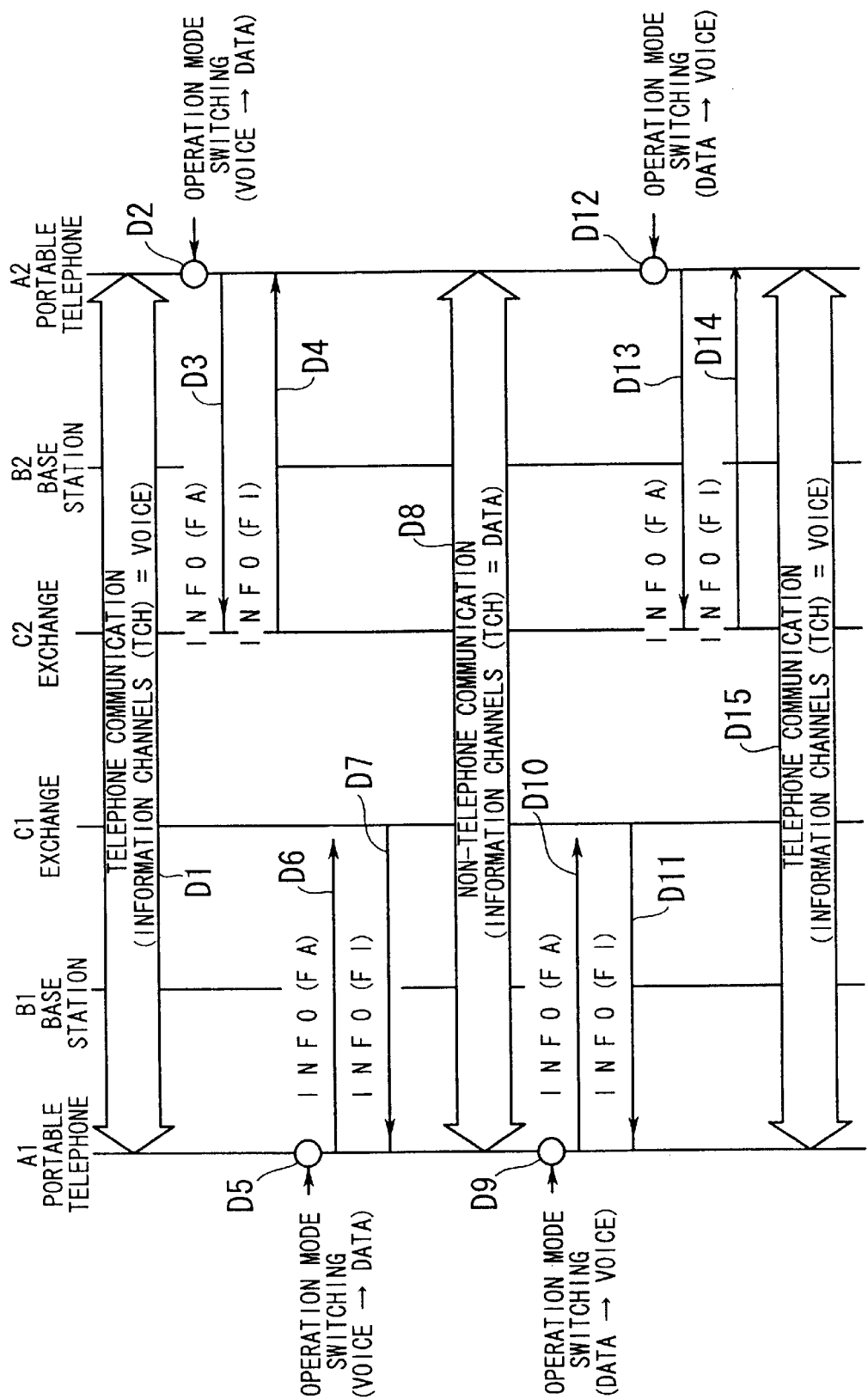
FIG. 25 is a sequence diagram illustrating a conventional procedure for switching between telephone communication and non-telephone communication, as prescribed by the standard (RCR-STD-27D) for digital mobile telephone systems.

Referring now to FIGS. 23 and 24, a procedure for authentication between the portable telephones 13 and 19 will be explained.

FIGS. 23 and 24 are flowcharts showing the authentication procedure, in which FIG. 23 shows the former half of the procedure and FIG. 24 shows the latter half of the same.

In the embodiment according to the present invention, the operation of the other party's portable telephone can be specified from a remote location, as described above. It is therefore possible that erroneous operation of the other party's portable telephone will be caused due to erroneous manipulation etc. of the user of the portable telephone from which specification data is transmitted. To prevent this, an authentication process described below is executed.

When a control information-related input operation that may possibly cause erroneous operation, such as the setting of automatic power cut or sound volume level, is performed on the portable telephone 13, the display control section 22 displays a message requesting entry of a confirmation code on the liquid crystal display screen 13j (S132) after confirming that the operation specified by the control information is a prespecified allowable operation (S131).

Viewing the displayed message, the user inputs a confirmation code, whereupon a determination is made as to whether or not the input confirmation code coincides with a code prerecorded in the portable telephone 13, and if the codes do not coincide, the user operation is ignored (S133). If the codes coincide, the control information is transmitted to the portable telephone 19 (S134) according to the control information transfer procedure mentioned above.

On receiving the control information (S135), the communication control section of the portable telephone 19 sends the control information to the display control section. The memory of the portable telephone 19 has an allowability table therein, in which are recorded the numbers allocated to subscribers with whom communication of control information is allowed. The display control section checks to see if the subscriber number of the portable telephone from which the control information has been received is recorded in the allowability table in the memory. If the subscriber number is recorded, operation setting is made as specified by the control information (S136), and if the subscriber number is not recorded, the notified control information is ignored (S137).

Instead of the above method of determining whether or not the subscriber number of the portable telephone from which the control information has been received is recorded in the allowability table in the memory, whether or not the subscriber number of the portable telephone from which the control information has been received is allowable, or whether or not the operation specified by the control information is allowable may be determined by a user operation (S138).

In the foregoing embodiment, data transfer between portable telephones is explained, but the applicability of the present invention is not limited to the situation where the two devices transferring data therebetween are both portable telephones, and one may be an ordinary wireline telephone insofar as the other is a portable telephone.

As described above, according to the present invention, one information channel TCH is always allocated for vocal communication and another channel is allocated for data transfer as needed. Further, as the data transfer channel, a suitable one of the slow associated control channel SACCH and the fast associated control channel FACCH is selected in accordance with the transfer data quantity. Alternatively, in accordance with the transfer data quantity, precedence of vocal communication or data transfer, and the vocal communication state (non-communication state), a suitable one of the slow associated control channel SACCH and the fast associated control channel FACCH is selected as the data transfer channel.

Specifically, data transfer never occupies both of the two information channels TCH, and a suitable one of the slow associated control channel SACCH and the fast associated control channel FACCH is selected in accordance with the transfer data quantity etc. so that the selected channel may be used as the transmission channel. Further, while the slow associated control channel SACCH is selected for the purpose of data transfer, the fast associated control channel FACCH is used for vocal communication. Consequently, efficient data transfer is achieved. Also, since a channel for exclusive use as a vocal communication channel is secured all the time, added services (call waiting, three-party speech, etc.) available only during vocal communication can be used during data transfer.

Furthermore, the data transfer state is monitored, and when the data transfer is completed without fail, the mode is automatically switched from the non-telephone communication mode back to the telephone communication mode. It is therefore possible to prevent the mode from being erroneously switched back during execution of data transfer and also to prevent the failure in mode switching though the data transfer has been completed.

The portable telephone of the transfer data-receiving side sends the transmitting side portable telephone a request for temporary regulation on transmission of transfer data, and in response to this request, the transmitting side portable telephone regulates the transmission therefrom. This prevents the omission of data from occurring at the receiving side portable telephone, whereby reliable data transfer can be achieved.

Further, by using the control information, it is possible to operate the other party's portable telephone from a remote location, thus permitting wide uses of the portable telephone.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data transfer device for a portable telephone, to which data terminal equipment having a data transmitting/receiving function is connectable and which has a radio link provided with an information channel, a fast associated control channel and a slow associated control channel, comprising:

transfer data quantity measuring means for measuring a data quantity of transfer data input from the data terminal equipment;

channel selecting means for comparing the data quantity measured by said transfer data quantity measuring means with a predetermined value, and selecting one of the fast associated control channel and the slow associated control channel in accordance with a result of the comparison;

data transfer means for sending the transfer data input from the data terminal equipment to the radio link by using the channel selected by said channel selecting means; and voice transmitting means for performing voice transmission by using the information channel, regardless of whether or not data transfer is performed by said data transfer means.

2. The data transfer device according to claim 1, wherein said voice transmitting means uses the information channel and the fast associated control channel to perform voice transmission when the slow associated control channel is selected by said channel selecting means.

3. The data transfer device according to claim 1, wherein said channel selecting means selects the fast associated control channel if the measured data quantity is larger than the predetermined value, and selects the slow associated control channel if the measured data quantity is smaller than the predetermined value.

4. The data transfer device according to claim 1, further comprising silent state monitoring means for monitoring vocal communication to detect a silent state, wherein said channel selecting means selects the fast associated control channel when a silent state is being detected by said silent state monitoring means.

5. The data transfer device according to claim 4, further comprising saving means for receiving from outside priority specification information specifying a preferential one of vocal communication and data transfer and storing the priority specification information, wherein said channel selecting means selects the slow associated control channel if no silent state is detected by said silent state monitoring means, if the priority specification information stored in said saving means specifies vocal communication, and if the measured data quantity is larger than the predetermined value, selects the fast associated control channel if no silent state is detected by said silent state monitoring means, if the priority specification information stored in said saving means specifies vocal communication, and if the measured data quantity is smaller than the predetermined value, selects the fast associated control channel if no silent state is detected by said silent state monitoring means, if the priority specification information stored in said saving means specifies data transfer, and if the measured data quantity is larger than the predetermined value, and selects the slow associated control channel if no silent state is detected by said silent state monitoring means, if the priority specification information stored in said saving means specifies data transfer, and if the measured data quantity is smaller than the predetermined value.

6. The data transfer device according to claim 1, further comprising:

storing means for temporarily storing transferred data;

transmission regulation request means for monitoring a storage state of said storing means, and making a request for transmission regulation to a device which is a source of data transfer if resources necessary for storage are not available; and regulating means for temporarily regulating transfer of data when transmission regulation is requested by a device which is a destination of data transfer.

7. The data transfer device according to claim 1, further comprising:

data communication monitoring means for monitoring a data communication state after vocal communication ends; and call connection releasing means for automatically releasing call connection when no data communication lasting for a predetermined time period or more is detected by said data communication monitoring means.

8. The data transfer device according to claim 1, further comprising:

data communication monitoring means for monitoring a data communication state after vocal communication ends; and power cut means for automatically cutting power supply to the portable telephone when no data communication lasting for a predetermined time period or more is detected by said data communication monitoring means.

9. The data transfer device according to claim 1, further comprising:

control signal transmitting means for receiving from outside a control signal for controlling operation of a device which is a destination of data transfer, and transmitting the control signal to the device; and operation control means for operating the portable telephone associated therewith in accordance with a control signal transmitted thereto from a device which is a source of data transfer.

10. The data transfer device according to claim 9, further comprising:

confirmation input display means for displaying information requesting input of a confirmation code before said control signal transmitting means transmits the control signal; and permitting means for collating a confirmation code input externally as a result of the display of information by said confirmation input display means, and permitting said control signal transmitting means to transmit the control signal when the input confirmation code is found to be valid.

11. The data transfer device according to claim 9, further comprising:

extracting means for extracting a remote party confirmation code accompanying the control signal before said operation control means operates the portable telephone associated therewith;

confirmation means for determining whether or not the remote party confirmation code extracted by said extracting means exists in a prerecorded table; and permitting means for permitting said operation control means to operate the portable telephone associated therewith when it is determined by said confirmation means that the remote party confirmation code exists in the table.

12. The data transfer device according to claim 9, further comprising:

permission information receiving means for receiving from outside permission information about whether or not said operation control means is permitted to operate the portable telephone associated therewith in accordance with the control signal; and control means for controlling operation of said operation control means in accordance with the permission information received by said permission information receiving means.

* * * * *